us011855826B2

(12) United States Patent
Xu et al.

(10) Patent No.: US 11,855,826 B2
(45) Date of Patent: Dec. 26, 2023

(54) CYCLIC PREFIX DURATION EXTENSION BY RESOURCE ELEMENT SKIPPING

(71) Applicant: QUALCOMM Incorporated, San Diego, CA (US)

(72) Inventors: Huilin Xu, Temecula, CA (US); Jun Ma, San Diego, CA (US); Weimin Duan, San Diego, CA (US); Mehmet Izzet Gurelli, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/470,735

(22) Filed: Sep. 9, 2021

(65) Prior Publication Data

US 2023/0077142 A1 Mar. 9, 2023

(51) Int. Cl.
*H04B 7/08* (2006.01)
*H04B 7/0404* (2017.01)
*H04B 7/06* (2006.01)
*H04W 72/04* (2023.01)
*H04L 27/26* (2006.01)
*H04L 5/00* (2006.01)
*H04W 72/23* (2023.01)

(52) U.S. Cl.
CPC ........ *H04L 27/2636* (2013.01); *H04L 5/0048* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2017/0346543 A1* | 11/2017 | Islam | H04B 7/0417 |
| 2019/0222279 A1* | 7/2019 | Xi | H04B 7/0617 |
| 2020/0288421 A1* | 9/2020 | Kim | H04W 72/046 |
| 2021/0321378 A1* | 10/2021 | Rahman | H04B 7/0695 |
| 2021/0376894 A1* | 12/2021 | Cha | H04B 7/0695 |
| 2023/0170969 A1* | 6/2023 | Kim | H04W 72/1268 375/267 |

* cited by examiner

*Primary Examiner* — Duc T Duong
(74) *Attorney, Agent, or Firm* — Arent Fox, LLP

(57) ABSTRACT

Example implementations include a method, apparatus and computer-readable medium of wireless communication for applying resource element (RE) skipping to a symbol where a beam change is to occur. A transmitter and a receiver determine that a beam change is to occur during the symbol. The transmitter allocates bits to a subset of REs for the symbol in a frequency domain allocation. Each RE of the subset is spaced apart by a number of empty REs. The transmitter performs an inverse fast Fourier transform (IFFT) on the REs to generate a time domain signal including a number of repetitions of a transmitted waveform. The receiver receives the time domain signal during at least a portion of the symbol. The receiver performs a fast Fourier transform (FFT) on the time domain signal and determines transmitted bits or a channel from the subset of REs output from the FFT.

30 Claims, 12 Drawing Sheets

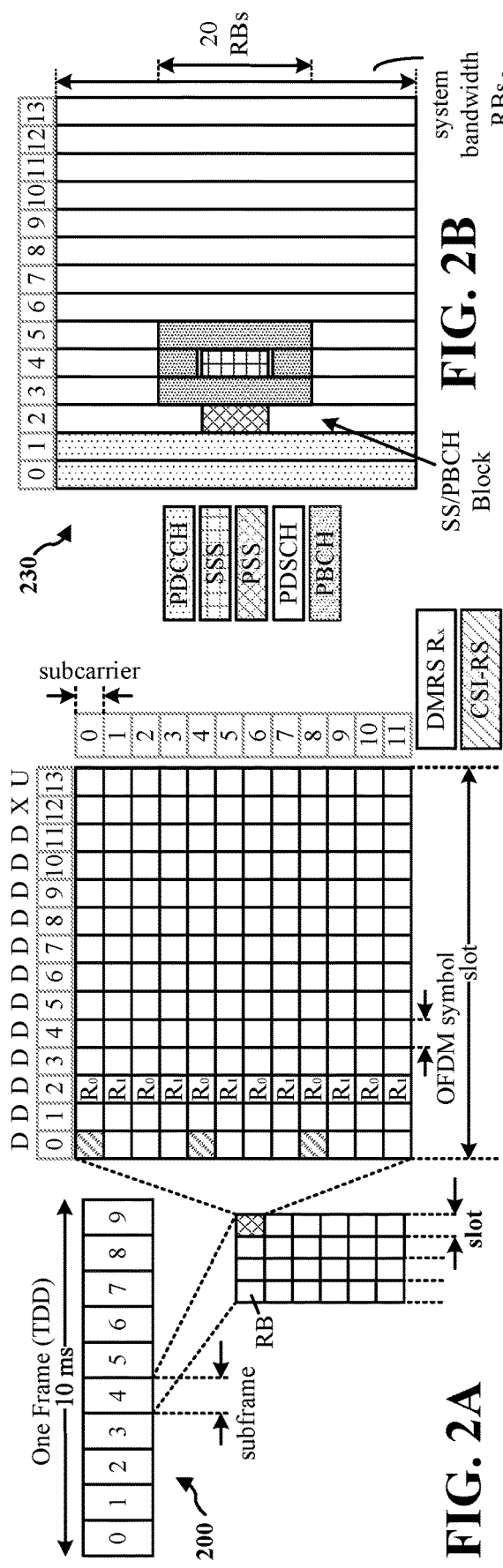
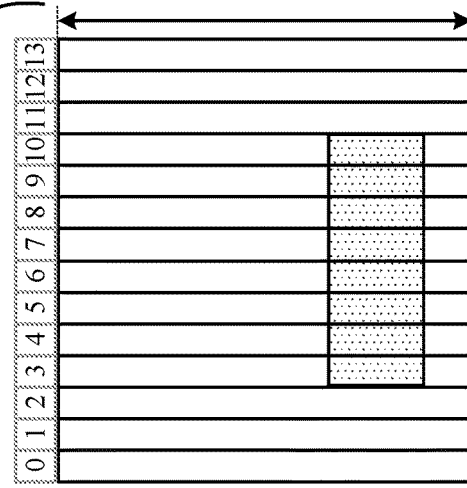
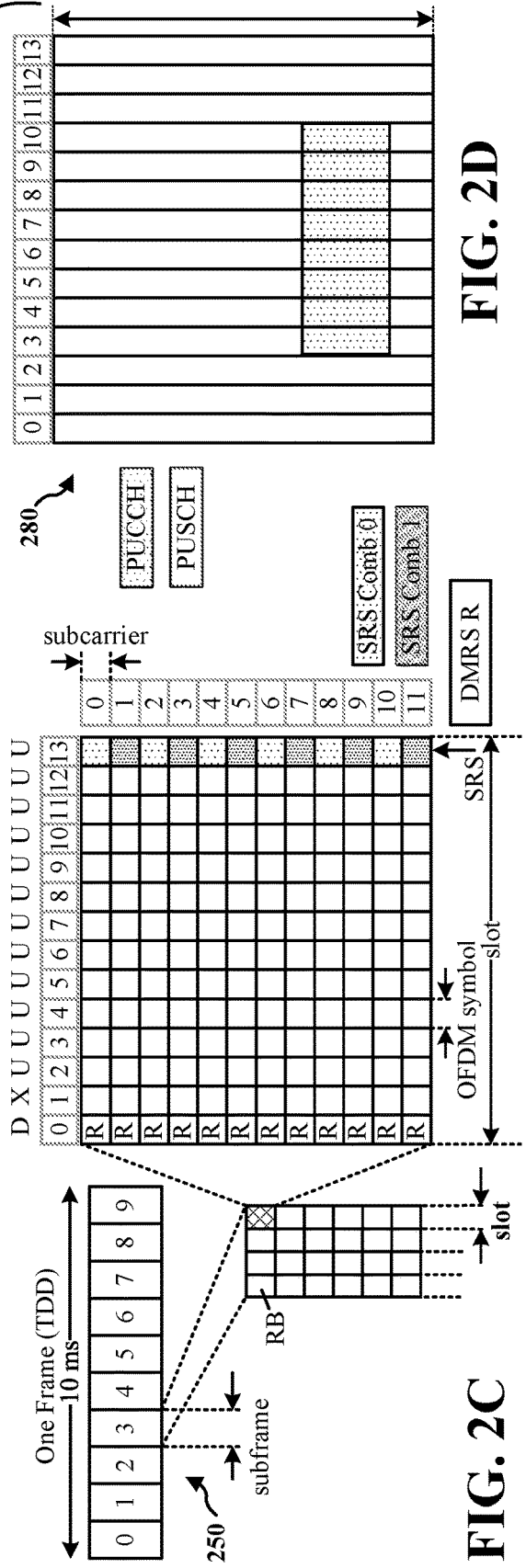

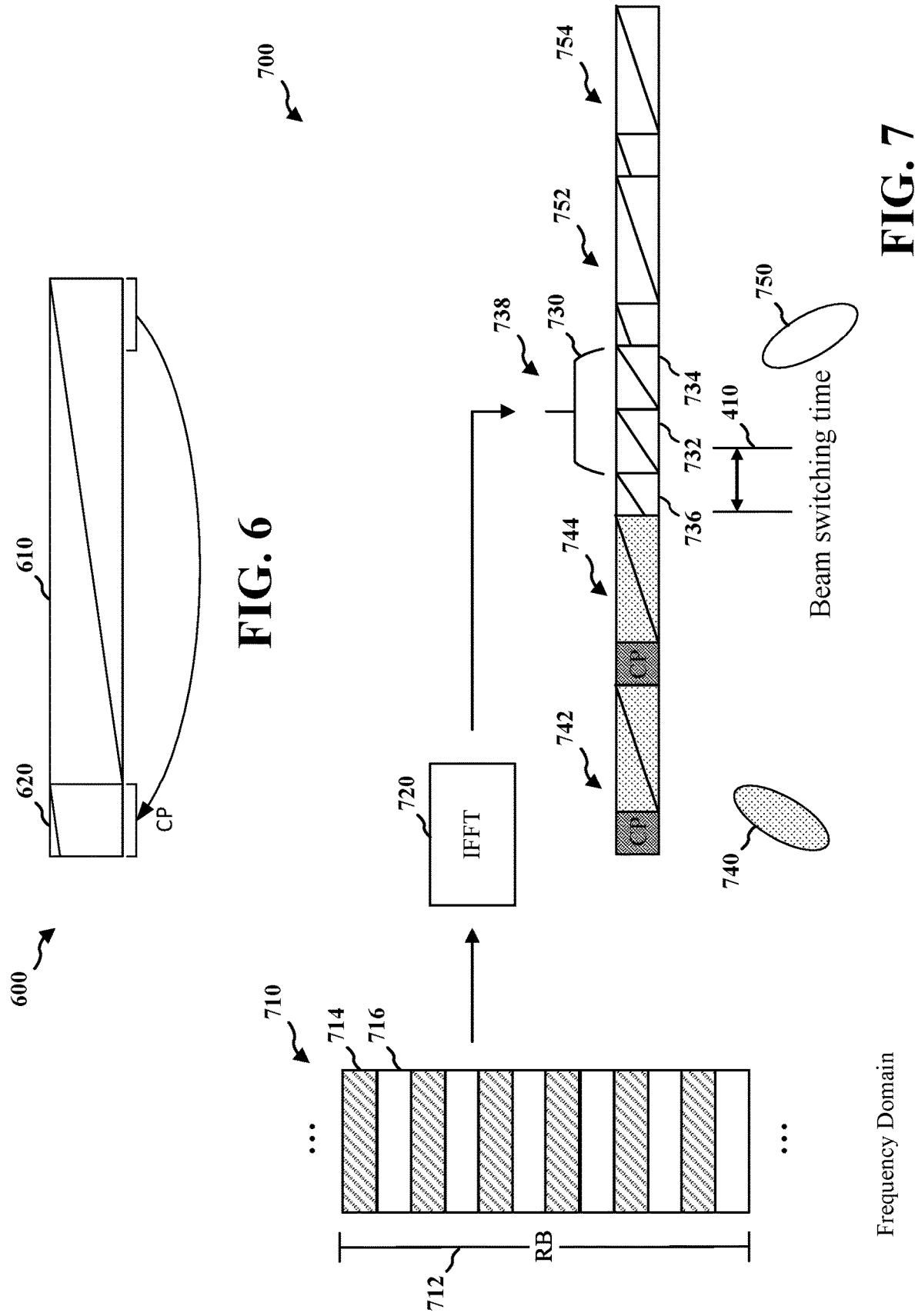

CYCLIC PREFIX DURATION EXTENSION BY RESOURCE ELEMENT SKIPPING

BACKGROUND

Technical Field

The present disclosure relates generally to communication systems, and more particularly, to performing resource element skipping to effectively extend a duration of a cyclic prefix.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a receiving device such as a user equipment (UE). The method includes determining that a beam change is to occur during a symbol. The method includes receiving a time domain signal during at least a portion of the symbol, wherein the time domain signal includes a number of repetitions of a waveform. The method includes performing a fast Fourier transform (FFT) on the time domain signal. The method includes determining transmitted bits or a channel from a subset of resource elements output from the FFT for a frequency domain allocation, wherein each resource element of the subset of resource elements is spaced apart by a number of empty resource elements equal to the number of repetitions of the waveform minus one.

In another aspect, the disclosure provides a method of wireless communication for a transmitting device. The method includes determining that a beam change is to occur during a symbol. The method includes allocating bits to a subset of resource elements for the symbol in a frequency domain allocation, wherein each resource element of the subset of resource elements is spaced apart by a number of empty resource elements. The method includes performing an inverse fast Fourier transform (IFFT) on the resource elements to generate a time domain signal. The method includes transmitting the time domain signal during the symbol, wherein the time domain signal includes a number of repetitions of a transmitted waveform equal to the number of empty resource elements between each resource element of the subset of resource elements plus one.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a UL channels within a subframe.

FIG. 6 is a diagram of an example timing for a beam switching operation.

FIG. 7 is a diagram of an example of a CP based on a time domain signal.

DETAILED DESCRIPTION

Figure 1:
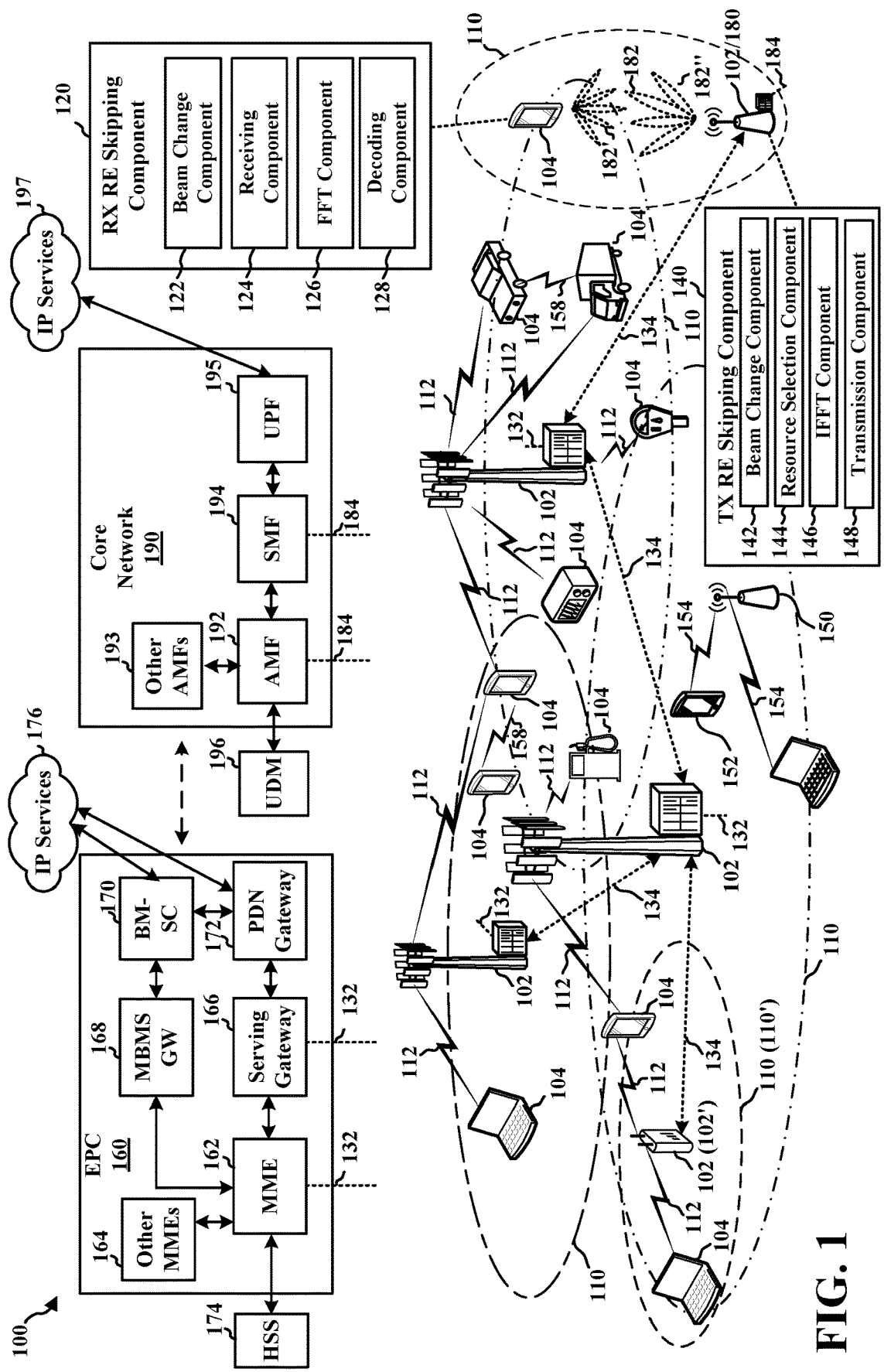
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A wireless network may utilize beamforming to improve signal quality between a base station and a user equipment (UE). The base station may configure the UE with various beam configurations, which may be referred to as a transmission configuration indicator (TCI) state for downlink transmissions and a spatial relation indicator (SRI) for uplink transmissions. The base station may transmit a beam switch command to the UE to change to one of the configured beams for a transmission. The base station and the UE may determine an activation time for the beam switch based on the beam switch command and change beams at the same time.

In an aspect, changing beams at either the base station or the UE may occur over a beam switching time during which the base station or the UE is unable to transmit or receive. For example, the beam switching time may be on the order of 100 nanoseconds (ns). Conventionally, a 1 millisecond (ms) subframe includes a number of symbols, each symbol having a cyclic prefix (CP) that was significantly longer than the 100 ns beam switching time. The base station and the UE can perform the beam switch during the CP and only redundant information would be lost. Accordingly, the base station and the UE would be able to transmit or receive the symbol using the new beam. However, as higher frequencies are utilized, numerologies having a greater subcarrier spacing (SCS) and shorter symbol time may be used. In such numerologies, the length of the CP may be shorter than the beam switching time. One approach to beam switching for such numerologies is to create a beam switching gap by skipping one or more symbols when the beam switch occurs. Such an approach, however, results in missing symbols and a reduction in data throughput.

In an aspect, the present disclosure provides for applying resource element (RE) skipping to a frequency domain signal to generate repetitions of a time domain signal within a symbol that act as a longer CP for symbols where a beam change occurs. In particular, a transmitter generates the repetitions of a time domain symbol by allocating bits to a subset of REs for the symbol in a frequency domain allocation. The allocated bits are spaced apart by a number of empty REs according to a sampling factor (N). For example, the bits may be allocated to a subset of REs including every Nth RE, where N is an integer greater than or equal to 2. In some implementations, N is a power of 2 (e.g., $2^n$). By allocating bits to every $N^{th}$ RE in the frequency domain, an inverse fast Fourier transform (IFFT) operation on the frequency domain signal will produce a time domain signal that includes N repetitions.

At the receiver, the N repetitions may provide a similar effect as a CP. That is, the receiver can receive any part of the time domain signal over a time tracking loop (TTL) window (i.e., one repetition). Accordingly, if there is a beam change operation and only a portion of the time domain signal is received, information of the signal is not lost. The receiver may duplicate the received repetition to generate a time domain signal that fills a fast Fourier transform (FFT) operation. The FFT operation on the time domain signal may produce a frequency domain signal at every $N^{th}$ RE. The receiver may then decode the bits of every $N^{th}$ RE or perform channel estimation if the bits correspond to a reference signal.

Accordingly, the present disclosure provides for transmission of a time domain signal that can be correctly received when part of the symbol is unavailable (for example, due to a beam change). Therefore, a beam change can be scheduled without introducing a gap symbol where no information is transmitted. The disclosed techniques may be used with CP-OFDM and DFT-S-FDM waveforms while maintaining symbol level alignment. Further, FFT-based frequency domain equalization (FDE) may be performed with the same sized FFT and IFFT as other symbols. Moreover, the generated waveform may maintain a flat average power spectral density in the frequency domain over used subcarriers. Accordingly, the signal may have good peak to average power ratio (PAPR) in comparison to other techniques for shortening a signal time.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In an aspect, one or more of the base stations 102 may include a TX RE skipping component 140 configured to perform a beam change within a symbol. In some aspects, the TX RE skipping component 140 may include a beam change component 142 configured to determine that a beam change is to occur during a symbol. The TX RE skipping component 140 may include a resource selection component 144 configured to allocate bits to a subset of resource elements for the symbol in a frequency domain allocation. Each resource element of the subset of resource elements is spaced apart by a number of empty resource elements. The TX RE skipping component 140 may include an IFFT component 146 configured to perform an inverse fast Fourier transform on the resource elements to generate a time domain signal. The TX RE skipping component 140 may include a transmission component 148 configured to transmit the time domain signal during the symbol. The time domain signal includes a number of repetitions of a transmitted waveform equal to the number of empty resource elements between the subset of resource elements plus one.

In an aspect, one or more of the UEs 104 may include a RX RE skipping component 120 configured to receive a signal within a symbol during which a beam change occurs. The RX RE skipping component 120 may include a beam change component 122 configured to determine that a beam change is to occur during a symbol. The RX RE skipping component 120 may include a receiving component 124 configured to receive a time domain signal during at least a portion of the symbol, wherein the time domain signal includes a number of repetitions of a waveform. In some aspects, the RX RE skipping component 120 may include a fast Fourier transform (FFT) component 126 configured to perform an FFT on the time domain signal. In some implementations, the RX RE skipping component 120 may include decoding component 128 configured to determine transmitted bits or a channel from a subset of resource elements output from the FFT for a frequency domain allocation. Each resource element of the subset of resource elements may be spaced apart by a number of empty resource elements equal to the number of repetitions of the waveform minus one.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing (SCS) and symbol length/duration are a function of the numerology. The SCS may be equal to $2^\mu * 15$ kHz, where $\mu$ is the numerology 0 to 5. As such, the numerology $\mu=0$ has a subcarrier spacing of 15 kHz and the numerology $\mu=5$ has a SCS of 480 kHz. The available numerologies may be expanded to include larger SCS (e.g., $\mu=6$ has a SCS of 960 kHz and $\mu=7$ has a SCS of 1920 kHz). The symbol length/duration is inversely related to the SCS. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

The following table (Table 1) includes an SCS, cyclic prefix time (Tcp), and symbol time/duration (Tsymb) for various numerologies.

TABLE 1

| $\mu$ | 0 | 1 | 2 | 3 | 4 | 5 | 6 | 7 |
|---|---|---|---|---|---|---|---|---|
| SCS (kHz) | 15 | 30 | 60 | 120 | 240 | 480 | 960 | 1920 |
| Tcp (ns) | 4687.5 | 2343.8 | 1171.9 | 585.9 | 293.0 | 146.5 | 73.2 | 36.6 |
| Tsymb (ns) | 66666.7 | 33333.3 | 16666.7 | 8333.3 | 4166.7 | 2083.3 | 1041.7 | 520.8 |

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
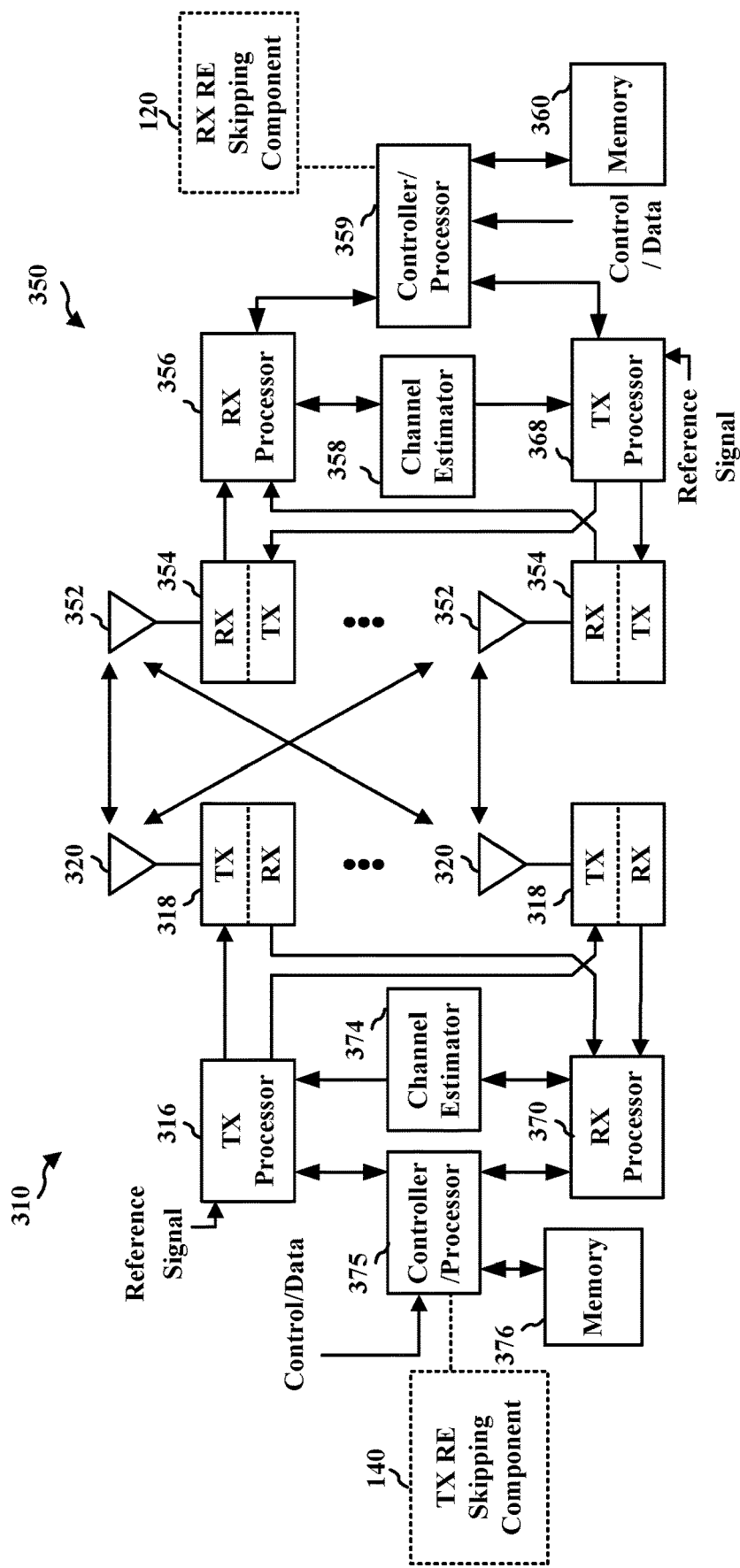
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RX RE skipping component 120 of FIG. 1.

At least one of the TX processor 316, the RX processor 370, and the controller/processor 375 may be configured to perform aspects in connection with the TX RE skipping component 140 of FIG. 1.

Figure 4:
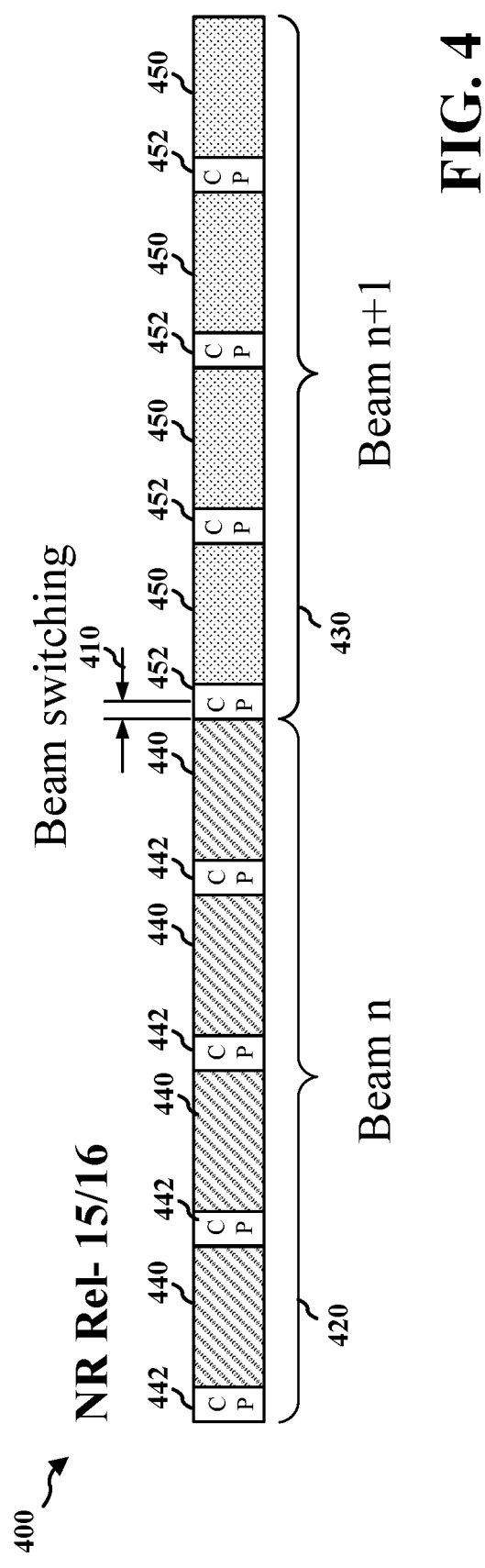
FIG. 4 is a diagram of an example beam switching operation during a cyclic prefix (CP).

FIG. 4 is a diagram 400 illustrating an example beam switching operation. A base station and/or a UE may have a beam switching time 410 for from changing from a first beam 420 to a second beam 430. For example, the beam switching time 410 may allow the base station 102 and/or the UE 104 to change antenna parameters. In an aspect, the beam switching time 410 may be relatively consistent for different frequencies and SCSs. For example, the beam switching time 410 may be on the order of 100 nanoseconds. In an aspect, the UE 104 may transmit an indication of a capability of the UE to change beams within a time period (e.g., the beam switching time 410).

For each beam 420, 430, the UE 104 and/or the base station 102 may transmit or receive a series of symbols 440, 450. Each symbol 440, 450 may include a cyclic prefix (CP) 442, 452. As discussed above with respect to FIGS. 2A-2D, the duration of the symbol 440 and the CP 442 depends on the numerology. As indicated above in table 1, numerologies $\mu=0$ to $\mu=5$ have a normal CP duration that may be greater than the beam switching time 410. Accordingly, in some implementations of NR releases 15 and 16, the beam switching time 410 may occur during a first CP 452 of the second beam 430. The symbol 450 may be transmitted during the symbol time without interruption due to the beam switching.

Figure 5:
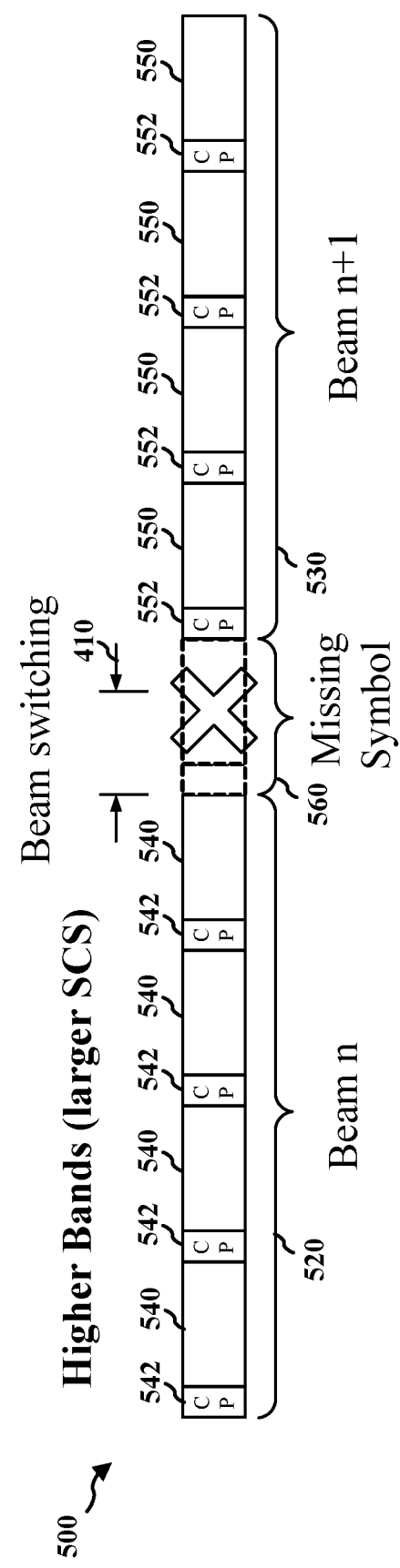
FIG. 5 is a diagram of an example beam switching operation during a gap due to a missing symbol.

FIG. 5 is a diagram 500 illustrating an example beam switching operation for a higher numerology or SCS. For instance, numerologies greater than 5 may be utilized at higher frequencies to allow higher throughput. A base station and/or a UE may have a beam switching time 410 for changing from a first beam 520 to a second beam 530. As noted above, as the SCS increases, the duration of symbols decreases. Accordingly, although the beam switching time 410 may be relatively the same at the higher numerology or SCS, the symbol duration and the CP duration may be relatively shorter. As indicated above in Table 1, the numerologies $\mu=6$ and $\mu=7$, as well as any greater numerologies, may include symbols 540, 550 that have a duration of a CP 542, 552 that is less than a beam switching time 410 of approximately 100 nanoseconds. Accordingly, the beam switching time 410 may not occur entirely within the first CP of the second beam 530.

One approach to switching beams when the beam switching time is greater than the CP duration is to skip a symbol during a transmission. For example, one or more missing symbols 560 and corresponding CPs may be skipped between the first beam 520 and the second beam 530. The missing symbol 560 may provide a sufficient gap in the transmission for the UE 104 and/or the base station 102 to switch beams. In an aspect, however, skipping a symbol may reduce throughput because the skipped symbol does not carry any information.

FIG. 6 is a diagram of an example of a symbol 600 including a time domain signal 610 and a CP 620. The time domain signal 610 is illustrated as a straight line, but the waveform of the time domain signal 610 may depend on the information to be transmitted. The CP 620 may be used with an OFDM waveform or a DFT-s-FDM waveform. The CP 620 may correspond to an end portion of the time domain signal 610 that is reproduced at the front of the time domain signal 610. With the CP 620, convolution between a transmitted symbol and the channel impulse response is equivalent to a circular convolution, which is convenient for digital signal processor implementation. For example, a time tracking loop (TTL) may be used to select a portion of the symbol equal in duration to the time domain signal 610 for processing. Accordingly, if the beginning or the end of the symbol 600 is not received (e.g., due to a beam change), a remaining portion of the symbol 600 may be processed.

FIG. 7 is a diagram 700 of an example of a frequency domain signal 710 including empty resource elements and a corresponding time domain signal 730 with repetitions. In an aspect, the signals 710 and 730 may be used in a symbol 738 where a beam change occurs. For example, a first beam 740 may be used in symbols 742 and 744. A beam change to a second beam 750 may occur during the symbol 738. The beam change may take a beam switching time 410, during which a transmitter may not transmit and a receiver may not receive. The remaining portion of the symbol 738 as well as symbols 752 and 754 may use the second beam 750.

The frequency domain signal 710 may be generated by the transmitter based on bits to transmit. The bits may correspond to data for a data channel (e.g., PDSCH) or a reference signal (e.g., DMRS or CSI-RS). The frequency domain signal 710 may include a number of allocated RBs 712, each RB 712 including 12 REs. In an aspect, a transmitter may allocate bits to a subset 714 of REs in each RB 712. The transmitter may allocate the bits based on a sampling factor (N) and allocate bits to every $N^{th}$ RE. In the illustrated example, N is 2 and the subset 714 includes every second RE or every other RE. The frequency domain signal 710 includes empty REs 716 between the subset 714 of REs. The number of empty REs 716 between the subset 714 of REs is equal to N minus 1 (N-1).

The frequency domain signal 710 may be provided to an IFFT 720, which transforms the frequency domain signal 710 into a time domain signal 730 for transmission in a symbol 738. The time domain signal 730 may include a number of repetitions 734 of a transmitted waveform 732. The number of repetitions is equal to N. In the illustrated example, the time domain signal 730 includes two repetitions of the transmitted waveform 732 (the original/first transmission and the repetition 734). Accordingly, the total number of repetitions in the time domain signal 730 is equal to the number of empty REs 716 between each RE of the subset 714 plus one. Additionally, the symbol 738 may include a CP 736 based on the time domain signal 730. The CP 736 may correspond to a portion of a repetition 734. As illustrated, the beam switching time 410 may occur during the CP 736 and the transmitted waveform 732. Accordingly, the CP 736 and/or the transmitted waveform 732 may not be transmitted or received. The receiver, however, may receive the waveform 732 by receiving a portion of the transmitted waveform 732 and a portion of the repetition 734. The receiver may replicate the waveform as measured by a time tracking loop for a number of repetitions as input to an FFT. That is, the receiver may replicate the received portion to generate the time domain signal 730 including the number of repetitions.

In an aspect, the network (e.g., TX RE skipping component 140) may indicate the sampling factor (N) and an offset (O) of a starting RE. For example, the TX RE skipping component 140 may transmit a configuration via RRC or MAC control element (MAC-CE). In some implementations, the TX RE skipping component 140 may dynamically indicate N and/or O in a downlink control information (DCI) that triggers the beam change.

In an aspect, the RE skipping using the frequency domain signal 710 may be applied to RBs allocated to the PDSCH within a symbol during which a beam switching operation is to occur. Resource allocation in other symbols assigned to the PDSCH may not be affected. That is, the other symbols may utilize every RE in the allocated RBs. In some implementations, the beam switch may occur in a first symbol or a last symbol of a PDSCH. For example, the DCI that triggers the beam change may indicate a TCI-state corresponding to the new beam that is to be used for the PDSCH. Accordingly, the beam switch may occur during the first symbol allocated to the PDSCH, and the first symbol may utilize RE skipping to facilitate reception of the signal if part of the signal within the symbol is not received due to the beam switching operation. If a beam switch were to be scheduled for another indicated symbol of a PDSCH, RE skipping may be applied to the indicated symbol.

Figure 8:
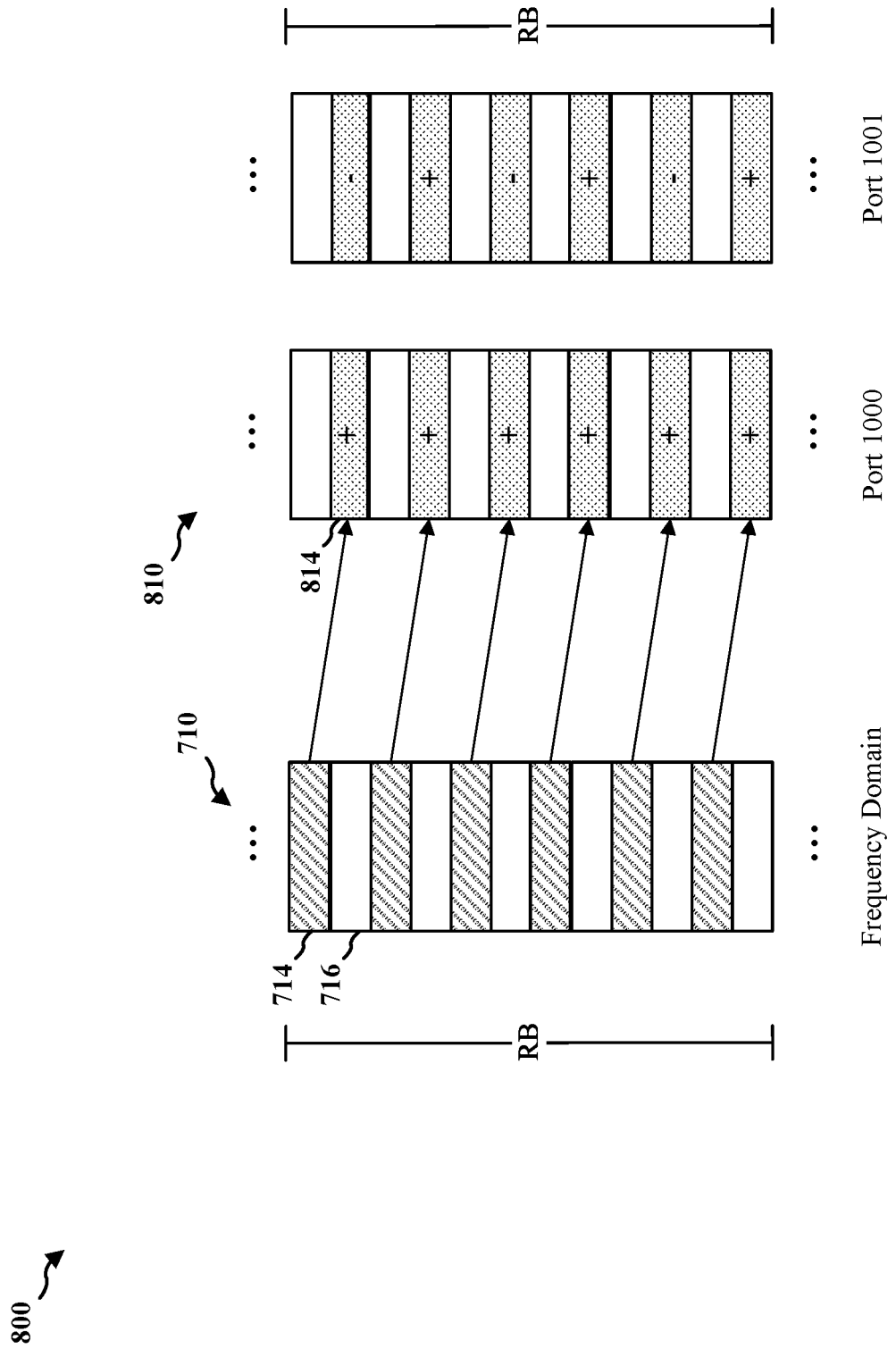
FIG. 8 is a diagram of an example of a frequency domain signal including empty resource elements and a corresponding time domain signal with repetitions.

FIG. 8 is a diagram 800 of a frequency domain signal 710 and demodulation reference signal (DMRS) 810. A symbol where a beam change occurs may be a PDSCH DMRS symbol. In some cases, a PDSCH may be front-loaded with DMRS for fast PDSCH decoding for low latency data. Accordingly, it may be beneficial to receive the DMRS in the symbol where the beam change occurs. A PDSCH DMRS configuration type 1 with 1 or 2 ports may utilize every other RE for DMRS. For example, the illustrated DMRS 810 may utilize port 1000 and port 1001. In some implementations, a channel state information reference signal (CSI-RS) may similarly be configured to utilize a subset of REs. To ensure that the reference signals (DMRS or CSI-RE) can be received, the RE skipping configuration may be aligned with the DMRS or CSI-RS configuration.

In an aspect, the network (e.g., TX RE skipping component 140) may ensure that the RE skipping configuration for beam change aligns with the DMRS configuration. For example, the TX RE skipping component 140 may select a RE skipping configuration with N=2 and O=1 to align with the illustrated DMRS 810. Accordingly, the UE may not be expected to perform the RE skilling to receive the PDSCH or CSI-RS in a symbol if any DMRS or CSI-RE is skipped in the symbol. In another aspect, the receiving device (e.g., RX RE skipping component 120) may shift a starting RE in the symbol for RE skipping such that the empty REs 716 do not collide with any DMRS RE or CSI-RS RE. For instance, even if a UE 104 is configured with an RE skipping configuration of N=2 and O=0, the RX RE skipping component 120 may shift the offset for symbols that include DMRS or CSI-RS. The TX RE skipping component 140 may transmit the DMRS or CSI-RS on the shifted REs according to the DMRS or CSI-RS configuration. In some implementations, the RE skipping configuration may not indicate the offset O, and the offset may be selected based on the DMRS or CSI-RS configuration.

Figure 9:
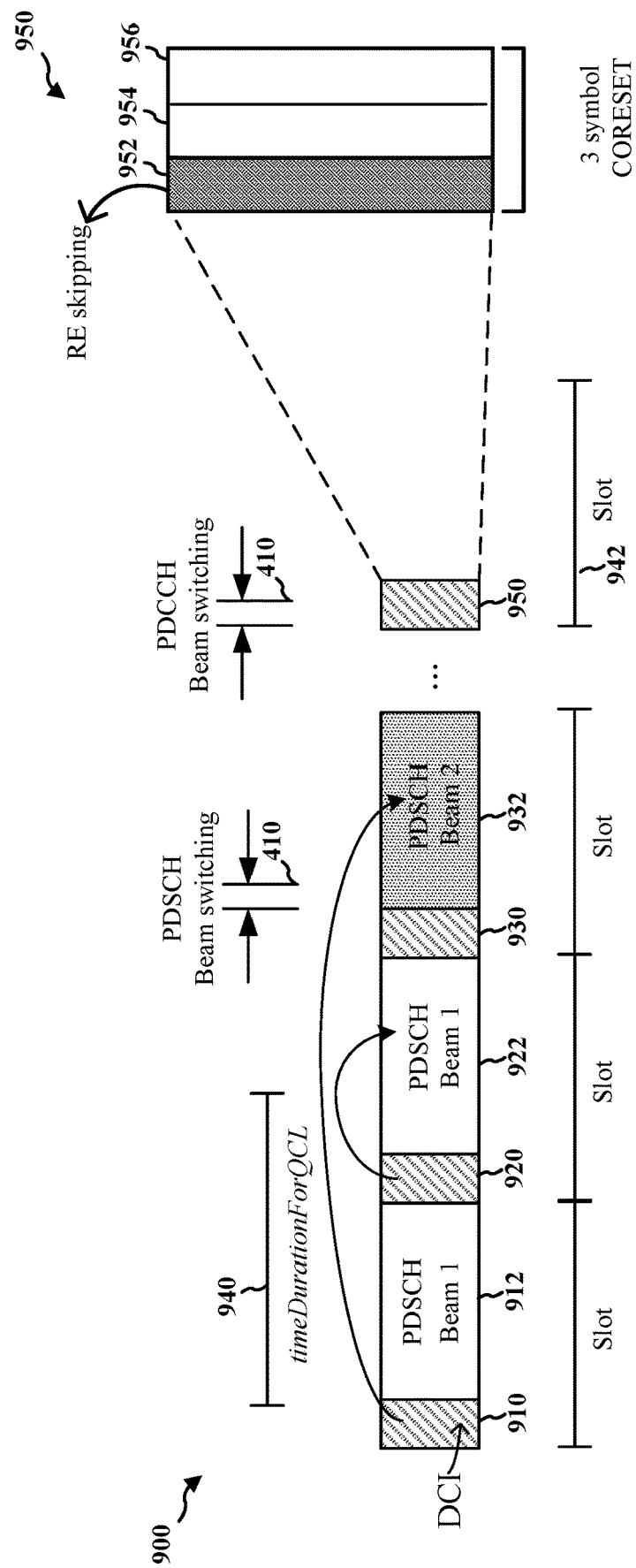
FIG. 9 is a diagram of a frequency domain signal and demodulation reference signal (DMRS).

FIG. 9 is a diagram 900 illustrating an example timing for a beam switch operation occurring during a CORESET 950. A base station 102 may transmit a beam switch command as a DCI 910 indicating a new TCI state. The DCI 910 may include a TDRA indicating a start symbol for a PDSCH 932. The UE 104 may have a capability 940 that indicates a minimum amount of time for the UE to change beams for a PDSCH after receiving the DCI 910. For example, the capability 940 may be referred to as a time duration for quasi-co-location (QCL). The capability 940 may be distinct from the beam switching time 410, which may only account for the time to switch beams. The base station 102 may consider the capability when determining the TDRA such that a time between the DCI 910 and the PDSCH 932 is greater than the capability 940.

One or more transmissions of PDSCH 912, 922 may occur before the beam switch. If the time duration between the DCI containing the TCI state update and the corresponding scheduled PDSCH is less than the capability 940, the UE 104 may apply the TCI state of the CORESET that contained the scheduling DCI. For example, the PDSCH 912 may be scheduled by a previous DCI (not shown) and use a first beam. The PDSCH 922 may be scheduled by the DCI 920. Although the DCI 920 may be transmitted after the DCI 910 and the beam switch may be scheduled, the PDSCH 922 may use the first beam because the PDSCH 922 starts within the capability 940. Similarly, the DCI 930 may use the first beam because the beam switch does not occur until the PDSCH 932.

For a beam change for PDCCH, the base station 102 may transmit a beam switch command as a MAC-CE with activation command. The MAC-CE may be carried on a PDSCH (e.g., PDSCH 912) and the UE 104 may acknowledge the PDSCH and MAC-CE in a slot k. The UE 104 may apply the beam change after a configured or specified minimum duration for a beam change for the PDCCH. For example, a standard or regulation may specify the minimum duration. In some implementations, the base station 102 may configure the minimum duration. For example, the standard or regulation may specify that the UE 104 may apply the beam switch command in a first slot that is after slot $k+3N_{slot}^{subframe,\mu}$. $N_{slot}^{subframe,\mu}$ slot may be a number of slots in a subframe for the numerology. Accordingly, in this example, the UE 104 may apply the beam switch command at least 3 ms after the MAC-CE. For example, a beam switch may occur during a slot 942, which may be configured with a CORESET 950 for receiving a PDCCH.

For either PDSCH or PDCCH, the scheduled slot or symbol for the beam change may have a CP length that is less than the beam switching time 410. Accordingly, as discussed above regarding FIGS. 7, the UE 104 and the base station 102 may utilize RE skipping to generate a time domain signal with repetitions that may serve as a CP.

The UE may attempt to blindly decode PDCCH candidates within the CORESET 950. The CORESET 950 may include multiple resource blocks and multiple symbols grouped into control channel elements (CCEs). The PDCCH candidates may include different numbers of CCEs at different aggregation levels. Such blind decoding techniques may not be compatible with RE skipping. For example, where RE skipping is applied to a first symbol 952 in the CORESET 950, there may be no guarantee that an amount of remaining REs within the CORESET 950 after RE skipping is equal to a number of CCEs configured for the CORESET. In some implementations, the UE 104 may be configured not to receive PDCCH in a CORESET 950 where a beam switch occurs. In some implementations, the UE 104 may be configured to receive PDCCH in remaining symbols 954, 956 of the CORESET other than the symbol 952 where the beam switch occurs. For example, the remaining symbols 954, 956 of the CORESET 950 may be viewed as a CORESET with a narrower duration, and the UE may convert the CORESET configuration of the CORESET 950 to receive PDCCH on only the remaining symbols 954, 956 of the CORESET 950.

Figure 10:
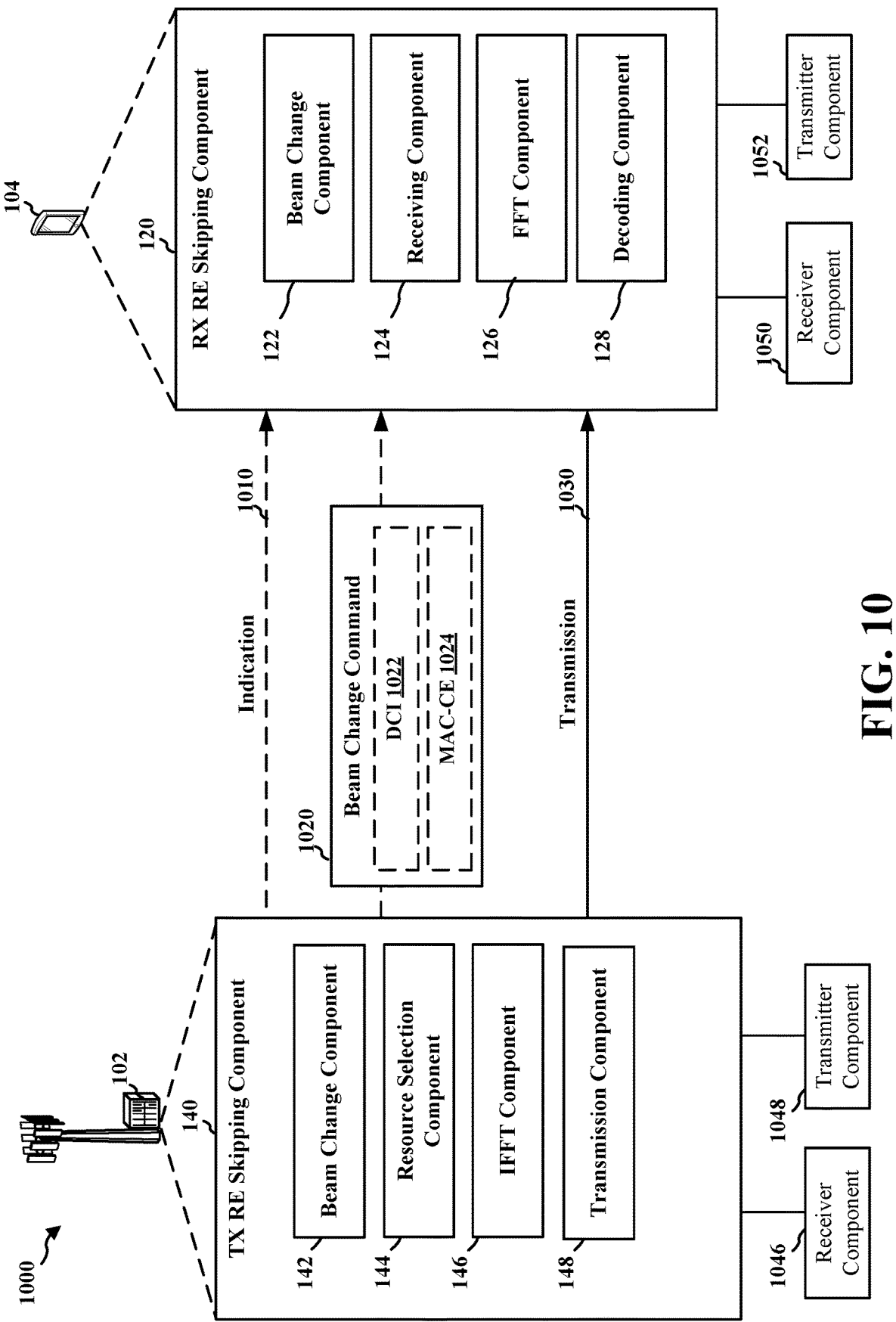
FIG. 10 is a diagram of an example communications and components of a base station and a UE.

FIG. 10 is a diagram 1000 illustrating example communications and components of a base station 102 and a UE 104. As illustrated, the UE 104 may include the RX RE skipping component 120 and the base station 102 may include the TX RE skipping component 140. In some implementations, (e.g., for uplink beam changes for PUSCH) the UE 104 may include a TX RE skipping component 140 and the base station 102 may include the RX RE skipping component 120.

The base station 102 may include a receiver component 1046, which may include, for example, a radio frequency (RF) receiver for receiving the signals described herein. The base station 102 may include a transmitter component 1048, which may include, for example, an RF transmitter for transmitting the signals described herein. In an aspect, the receiver component 1046 and the transmitter component 1048 may be collocated in a transceiver, which may be coupled with the TX RE skipping component 140.

As discussed above regarding FIG. 1, the UE 104 may include the RX RE skipping component 120 including the beam change component 122, the receiving component 124, the FFT component 126, and the decoding component 128. The UE 104 may also include a receiver component 1050 and a transmitter component 1052. The receiver component 1050 may include, for example, a RF receiver for receiving the signals described herein. The transmitter component 1052 may include for example, an RF transmitter for transmitting the signals described herein. In an aspect, the receiver component 1050 and the transmitter component 1052 may be collocated in a transceiver.

The UE 104 may transmit an indication 1010 of a number of empty resource elements and a starting resource element. For example, the indication 1010 may include a value for the sampling factor N and a value for the offset O. In some implementations, the number of empty resource elements may be N-1. Alternatively, the number of empty resource elements may be transmitted and N may be one plus the number of empty resource elements. The indication 1010 may be transmitted as an RRC message, a MAC-CE, or a DCI.

The TX RE skipping component 140 may determine a symbol where the beam change is to occur. The TX RE skipping component 140 may transmit a beam change command 1020 that triggers the beam change at the UE 104. For example, the beam change command 1020 may be a DCI 1022 that indicates a new TCI state for PDSCH transmission. As another example, the beam change command 1020 may be a MAC-CE 1024 that indicates a new TCI state for PDCCH transmission. In some implementations, the beam change command 1020 may carry the indication 1010.

The TX RE skipping component 140 may transmit a transmission 1030 in the symbol where the beam change is to occur (e.g., symbol 738). The transmission 1030 may be the time domain signal 730 including a number of repetitions 734 of the transmitted waveform 732.

Figure 11:
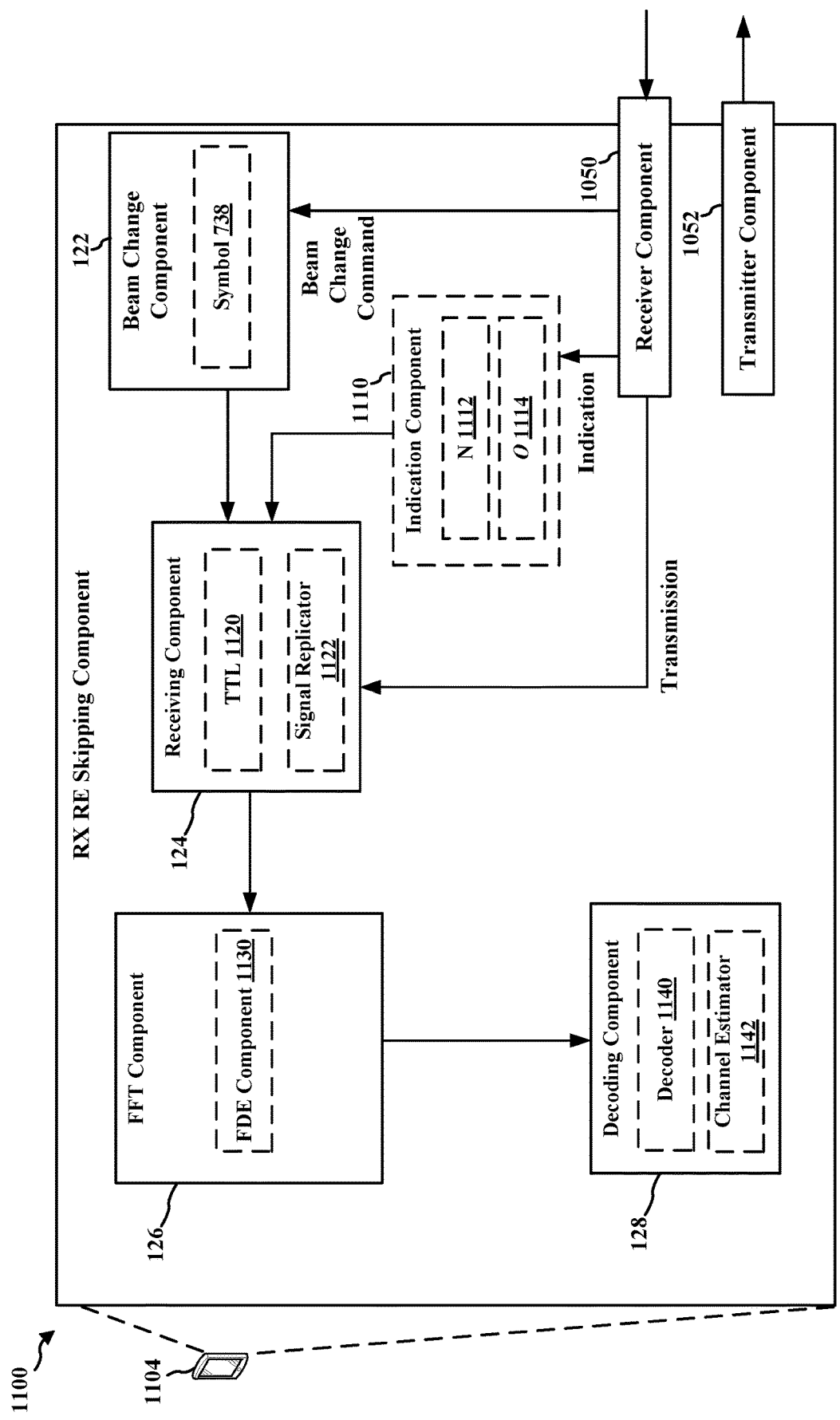
FIG. 11 is a conceptual data flow diagram illustrating the data flow between different means/components in an example UE.

FIG. 11 is a conceptual data flow diagram 1100 illustrating the data flow between different means/components in an example UE 1104, which may be an example of the UE 104 including the RX RE skipping component 120.

The receiver component 1050 may receive downlink signals including the indication 1010, the beam change command 1020, and the transmission 1030. The receiver component 1050 may pass the indication 1010 to the indication component 1110. The receiver component 1050 may pass the beam change command 1020 to the beam change component 122. The receiver component 1050 may pass the transmission 1030 to the receiving component 124.

The indication component 1110 may receive the indication 1010. The indication component 1110 may extract a number of empty resource elements and a starting resource element from the indication 1010. For example, in an implementation, the indication 1010 may include a value 1112 for the sampling factor N and a value 1114 for the offset O. The number of empty REs 716 may be equal to N-1. The indication component 1110 may determine the number of repetitions, which may be equal to N. The indication component 1110 may provide the number of empty resource elements and a starting resource element to the receiving component 124.

The beam change component 122 may receive the beam change command 1020. The beam change component 122 may determine that a beam change is to occur during the symbol 738. For example, the beam change component 122 may determine that the beam change is to occur at a start of the symbol 738 based on the beam change command 1020. The beam change component 122 may provide an indication of the symbol 738 to the receiving component 124.

The receiving component 124 may receive a time domain signal (e.g., the transmission 1030) during at least a portion of the symbol 738 from the receiver component 1050. For example, the portion of the symbol 738 may exclude the beam switching time 410. In some implementations, the receiving component 124 may include a time tracking loop (TTL) 1120 that is configured to receive a time domain signal for a length of the transmitted waveform 732. For example, the length of the transmitted waveform 732 may be configured based on the indicated number of empty resource elements or the indicated number of repetitions. In some implementations, the receiving component 124 may include a signal replicator 1122 configured to replicate the portion of the received signal for the indicated number of repetitions to generate a time domain signal of one symbol duration. The receiving component 124 may provide the time domain signal to the FFT component 126.

The FFT component 126 may perform a FFT on the received time domain signal including the number of repetitions to generate the frequency domain signal 710. In some implementations, the FFT may be the same size as other symbols for the sub-carrier spacing and frequency domain allocation. In some implementations, the FFT component 126 includes a frequency domain equalization (FDE) component 1130 configured to perform FFT based frequency domain equalization. The FFT component 126 may provide the frequency domain signal 710 to the decoding component 128.

The decoding component 128 may determine transmitted bits or a channel from the subset 714 of resource elements output from the FFT. Each resource element of the subset 714 of resource elements may be spaced apart by the number of empty REs 716. In some implementations, the decoding component 128 may include a decoder 1140 configured to determine the transmitted bits based on the frequency domain signal 710. For instance, determining the transmitted bits may include decoding the frequency domain signal according to a modulation and coding scheme. In some implementations, the decoding component 128 may include a channel estimator 1142 configured to determine a channel based on the frequency domain signal 710. Determining the channel may include estimating the channel based on known bits of a reference signal (e.g., DMRS or CSI-RS).

Figure 12:
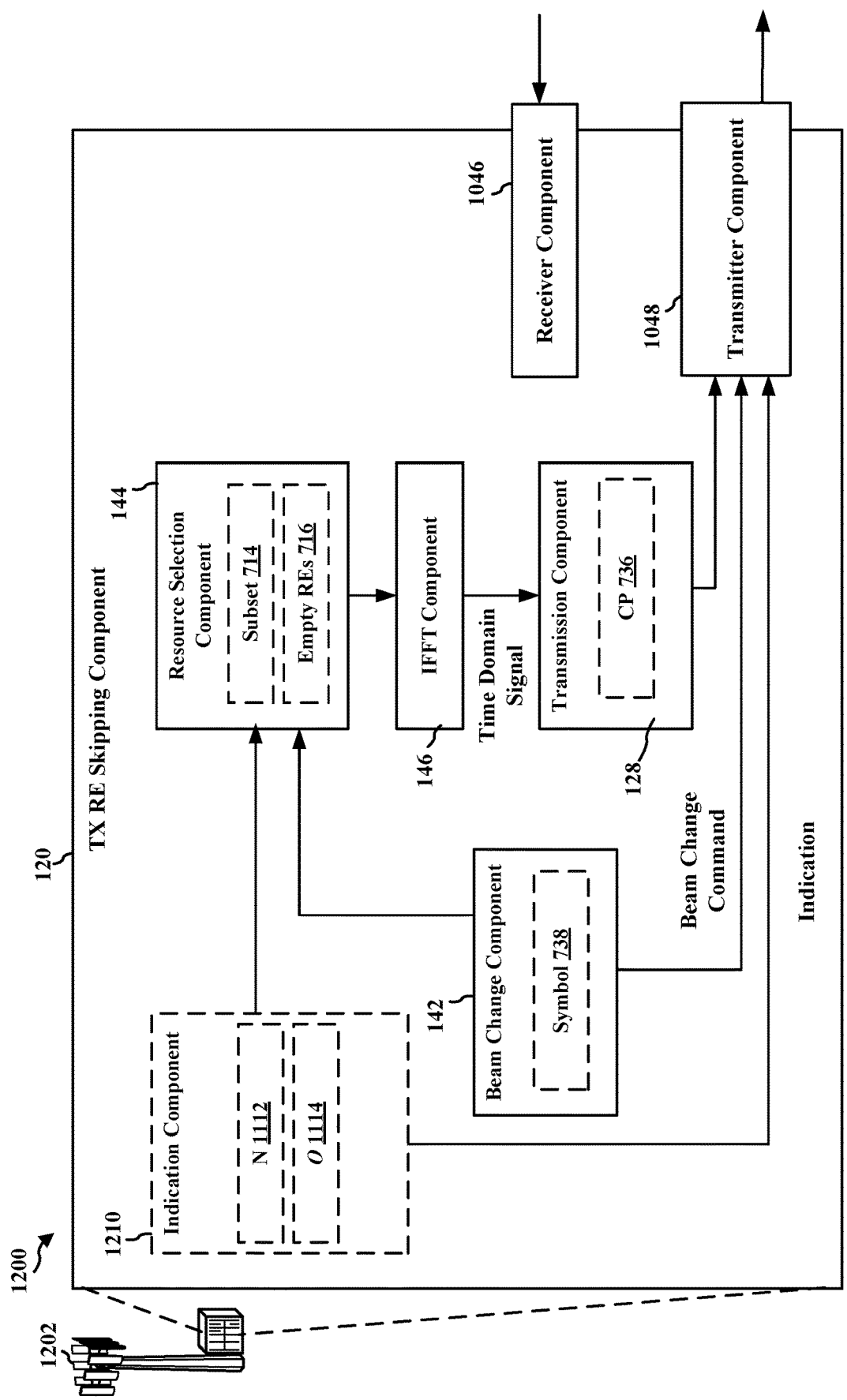
FIG. 12 is a conceptual data flow diagram illustrating the data flow between different means/components in an example base station.

FIG. 12 is a conceptual data flow diagram 1200 illustrating the data flow between different means/components in an example base station 1202, which may be an example of the base station 102 and include the TX RE skipping component 140.

The receiver component 1046 may receive uplink signals such as feedback from the UE 104 including CSI. The receiver component 1046 may provide the feedback to the beam change component 142.

The base station 1202 may optionally include an indication component 1210 configured to transmit an indication of the number of empty resource elements and a starting resource element. For example, the indication component 1210 may generate the indication 1010. For example, in an implementation, the indication 1010 may include a value 1112 for the sampling factor N and a value 1114 for the offset O. The number of empty REs 716 may be equal to N-1. The indication component 1210 may set the value 1112 for the sampling factor N to the number of empty REs 716 plus one. The indication component 1210 may set the value 1114 for the offset O based on a configuration (e.g., a configuration of the DMRS 810). The indication component 1210 may provide the number of empty resource elements and a starting resource element to the resource selection component 144.

The beam change component 142 may determine that a beam change is to occur during a symbol. For example, the beam change component 142 may determine to transmit the beam change command 1020 based on feedback from the UE such as the CSI. The beam change component 142 may generate and transmit the beam change command 1020. The beam change component 142 may determine that the beam change occurs during the symbol 738 based on the beam change command 1020. For example, the symbol 738 may be indicated by the beam change command 1020 or calculated based on the transmission of the beam change command 1020 or an acknowledgment thereof. The beam change component 142 may provide an identification of the symbol 738 to the resource selection component 144.

The resource selection component 144 may determine the subset 714 of resource elements and the empty REs 716 based on the indication of the number of empty resource elements, the starting resource element, and a frequency domain resource allocation for the symbol 738. The resource selection component 144 may allocate bits to the subset 714 of resource elements of the frequency domain signal 710.

The resource selection component 144 may designate empty REs 716 between each RE of the subset 714. The resource selection component 144 may provide the frequency domain signal 710 to the IFFT component 146.

The IFFT component 146 may perform an inverse fast Fourier transform on the resource elements of the frequency domain signal 710 to generate the time domain signal 730. In some implementations, the IFFT may have a same size as other symbols without RE skipping. The IFFT component 146 may provide the time domain signal 730 to the transmission component 148.

The transmission component 148 may add the CP 736 to the time domain signal 730 to generate the transmission 1030 for the symbol 738. The transmission component 148 may transmit the transmission 1030 during the symbol 738 via the transmitter component 1048. The transmission 1030 may include the CP 736, the transmitted waveform 732, and one or more repetitions 734. The total number of repetitions of the transmitted waveform 732 in the transmission 1030 (including the original transmitted waveform 732) may be equal to the number of empty REs 716 plus one, which may be equal to the sampling factor N. It should be understood that due to the beam change, a portion of the transmission 1030 (e.g., the portion corresponding to the beam switching time 410) may not be transmitted by the transmitter component 1048. However, because the transmission 1030 includes the repetitions 734, at least one copy of the transmitted waveform 732 may be transmitted.

Figure 13:
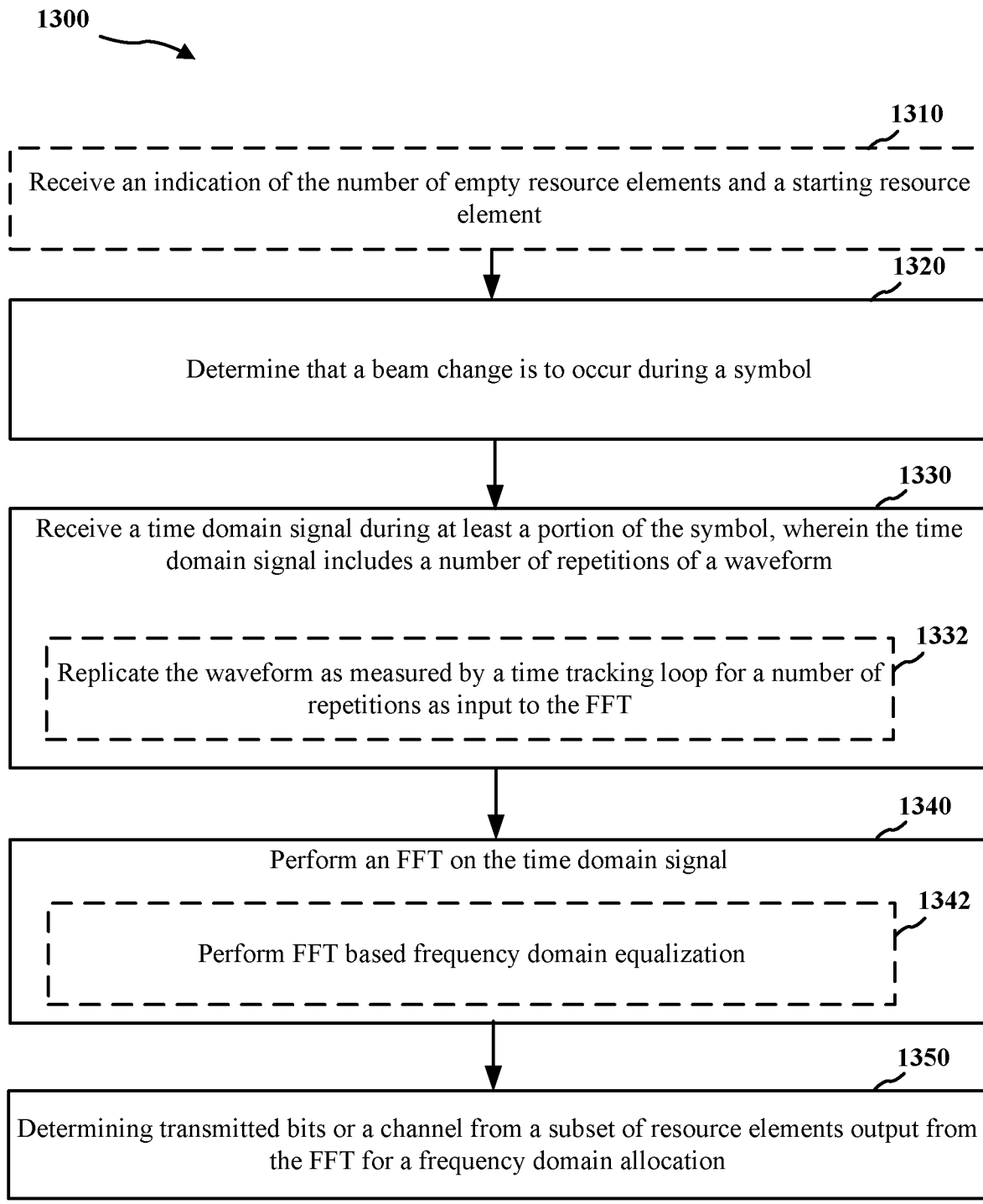
FIG. 13 is a flowchart of an example of a method of beam switching at a UE.

FIG. 13 is a flowchart of an example method 1300 for receiving a signal during a symbol with RE skipping. The method 1300 may be performed by a UE (such as the UE 104, which may include the memory 360 and which may be the entire UE 104 or a component of the UE 104 such as the RX RE skipping component 120, TX processor 368, the RX processor 356, or the controller/processor 359). The method 1300 may be performed by the RX RE skipping component 120 in communication with the TX RE skipping component 140 of the base station 102.

At block 1310, the method 1300 may optionally include receiving an indication of the number of empty resource elements and a starting resource element. In an aspect, for example, the UE 104, the RX processor 356 and/or the controller/processor 359 may execute the RX RE skipping component 120 and/or the indication component 1110 to receive the indication 1010 of the number of empty REs 716 and a starting resource element. For example, the indication 1010 may include a value of the sampling factor N and the offset O, or the number of empty REs 716 between the subset 714 of resource elements. In some implementations, indication 1010 is an RRC message, a MAC-CE, or a DCI. The DCI may be the DCI 1022 that triggers the beam change. Accordingly, the UE 104, the RX processor 356, and/or the controller/processor 359 executing the RX RE skipping component 120 and/or the indication component 1110 may provide means for receiving an indication of the number of empty resource elements and a starting resource element.

At block 1320, the method 1300 may include determining that a symbol is a first symbol after a beam change. In an aspect, for example, the UE 104, the RX processor 356 and/or the controller/processor 359 may execute the RX RE skipping component 120 and/or the beam change component 122 to determine that a symbol 738 is a first symbol after a beam change. For example, the beam change may occur at the start of the symbol 738 and the remaining portion of the symbol 738 after the beam switching time 410 may include a signal. The beam change component 122 may determine the symbol 738 based on the beam change command 1020. For example, the beam change component 122 may determine the symbol 738 based on the DCI 1022 or a slot in which the MAC-CE 1024 is received. Accordingly, the UE 104, the RX processor 356, and/or the controller/processor 359 executing the RX RE skipping component 120 and/or the beam change component 122 may provide means for determining that a symbol is a first symbol after a beam change.

At block 1330, the method 1300 may include receiving a time domain signal during at least a portion of the symbol. The time domain signal includes a number of repetitions of a waveform. In an aspect, for example, the UE 104, the RX processor 356 and/or the controller/processor 359 may execute the RX RE skipping component 120 and/or the receiving component 124 to receive the time domain signal 730 during at least a portion of the symbol 738. The time domain signal 730 includes a number of repetitions 734 of a waveform 732. In some implementations, at sub-block 1332, the block 1330 may include replicating the waveform 732 as measured by a time tracking loop for a number of repetitions as input to a FFT (e.g., FFT component 126). Accordingly, the UE 104, the RX processor 356, and/or the controller/processor 359 executing the RX RE skipping component 120 and/or the receiving component 124 may provide means for receiving a time domain signal during at least a portion of the symbol.

At block 1340, the method 1300 may include performing a FFT on the time domain signal. In an aspect, for example, the UE 104, the RX processor 356 and/or the controller/processor 359 may execute the RX RE skipping component 120 and/or the FFT component 126 to perform an FFT on the time domain signal 730. The FFT may convert the time domain signal 730 to the frequency domain signal 710. In some implementations, at sub-block 1342, the block 1340 may include performing FFT based frequency domain equalization. For example, frequency domain equalization may include performing channel estimation and multiplying the channel estimate by the sub-carriers. Accordingly, the UE 104, the RX processor 356, and/or the controller/processor 359 executing the RX RE skipping component 120 and/or the FFT component 126 may provide means for performing an FFT on the time domain signal.

At block 1350, the method 1300 may include determining transmitted bits or a channel from a subset of resource elements output from the FFT for a frequency domain allocation. In an aspect, for example, the UE 104, the RX processor 356 and/or the controller/processor 359 may execute the RX RE skipping component 120 and/or the decoding component 128 to determine transmitted bits or a channel from the subset 714 of resource elements output from the FFT (e.g., FFT component 126) for a frequency domain allocation. Accordingly, the UE 104, the RX processor 356, and/or the controller/processor 359 executing the RX RE skipping component 120 and/or the decoding component 128 may provide means for determining transmitted bits or a channel from a subset of resource elements output from the FFT for a frequency domain allocation.

Figure 14:
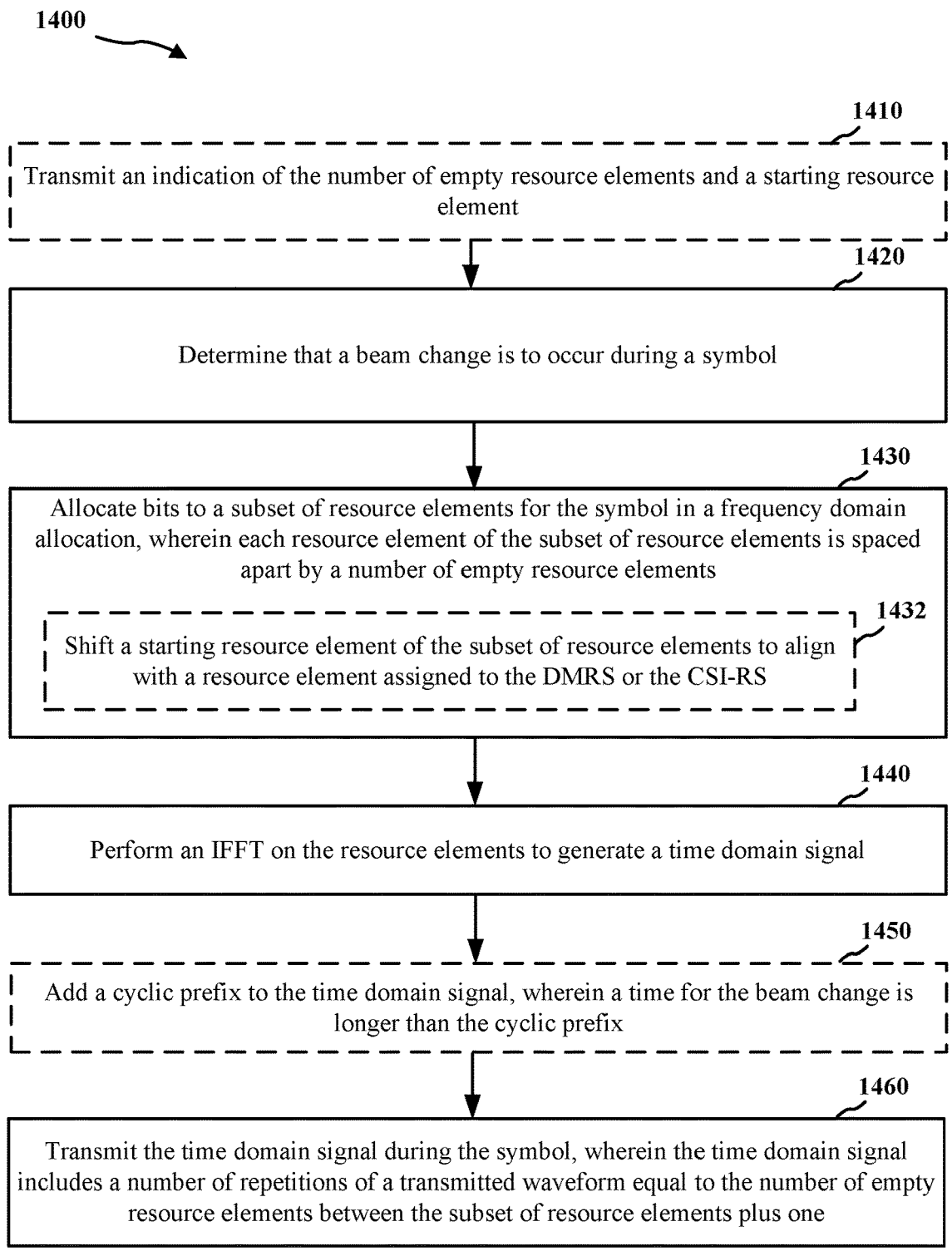
FIG. 14 is a flowchart of an example of a method of beam switching at a base station.

FIG. 14 is a flowchart of an example method 1400 of switching beams at a base station. The method 1400 may be performed by a base station (such as the base station 102, which may include the memory 376 and which may be the entire base station 102 or a component of the base station 102 such as the TX RE skipping component 140, TX processor 316, the RX processor 370, or the controller/processor 375). The method 1400 may be performed by the TX RE skipping component 140 in communication with the RX RE skipping component 120 of the UE 104.

At block 1410, the method 1400 may optionally include transmitting an indication of the number of empty resource elements and a starting resource element. In an aspect, for example, the base station 102, the controller/processor 375, and/or the TX processor 316 may execute the TX RE skipping component 140 and/or the indication component 1210 to transmit the indication 1010 of the number of empty REs 716 and a starting resource element. For example, the indication 1010 may include a value of the sampling factor N and the offset O, or the number of empty REs 716 between the subset 714 of resource elements. In some implementations, indication 1010 is an RRC message, a MAC-CE, or a DCI. The DCI may be the DCI 1022 that triggers the beam change. Accordingly, the base station 102, the controller/processor 375, and/or the TX processor 316 executing the TX RE skipping component 140 and/or the indication component 1210 may provide means for transmitting an indication of the number of empty resource elements and a starting resource element.

At block 1420, the method 1400 may include determining that a symbol is a first symbol after a beam change. In an aspect, for example, the base station 102, the controller/processor 375, and/or the TX processor 316 may execute the TX RE skipping component 140 and/or the beam change component 142 to determine that the symbol 738 is the first symbol after a beam change. Accordingly, the base station 102, the controller/processor 375, and/or the TX processor 316 executing the TX RE skipping component 140 and/or the beam change component 142 may provide means for determining that a symbol is a first symbol after a beam change.

At block 1430, the method 1400 may include allocating bits to a subset of resource elements for the symbol in a frequency domain allocation. Each resource element of the subset of resource elements is spaced apart by a number of empty resource elements. In an aspect, for example, the base station 102, the controller/processor 375, and/or the TX processor 316 may execute the TX RE skipping component 140 and/or the resource selection component 144 to allocate bits to the subset 714 of resource elements for the symbol 738 in a frequency domain allocation. Each resource element of the subset 714 of resource elements is spaced apart by a number of empty REs 716. In some implementations, at sub-block 1432, the block 1430 may include shifting a starting resource element of the subset 714 of resource elements to align with a resource element 814 assigned to a DMRS 810 or a CSI-RS Accordingly, the base station 102, the controller/processor 375, and/or the TX processor 316 executing the TX RE skipping component 140 and/or the resource selection component 144 may provide means for allocating bits to a subset of resource elements for the symbol in a frequency domain allocation.

At block 1440, the method 1400 may include performing an IFFT on the resource elements to generate a time domain signal. In an aspect, for example, the base station 102, the controller/processor 375, and/or the TX processor 316 may execute the TX RE skipping component 140 and/or the IFFT component 146 to perform an IFFT 720 on the resource elements to generate a time domain signal 730. Accordingly, the base station 102, the controller/processor 375, and/or the TX processor 316 executing the TX RE skipping component 140 and/or the IFFT component 146 may provide means for performing a FFT on the resource elements to generate a time domain signal.

At block 1450, the method 1400 may include adding a cyclic prefix to the time domain signal. The time for the beam change is longer than the cyclic prefix. In an aspect, for example, the base station 102, the controller/processor 375, and/or the TX processor 316 may execute the TX RE skipping component 140 and/or the transmission component 148 to add the CP 736 to the time domain signal 730. The beam switching time 410 is longer than the CP 736. Accordingly, the base station 102, the controller/processor 375, and/or the TX processor 316 executing the TX RE skipping component 140 and/or the transmission component 148 may provide means for adding a cyclic prefix to the time domain signal, wherein a time for the beam change is longer than the cyclic prefix.

At block 1460, the method 1400 may include transmitting the time domain signal during the symbol. The time domain signal includes a number of repetitions of a transmitted waveform equal to the number of empty resource elements between consecutive resource elements of the subset of resource elements plus one. In an aspect, for example, the base station 102, the controller/processor 375, and/or the TX processor 316 may execute the TX RE skipping component 140 and/or the transmission component 148 to transmit the time domain signal 730 during the symbol 738. The time domain signal 730 includes a number of repetitions 734 of a transmitted waveform 732 equal to the number of REs 716 between each resource element of the subset 714 of resource elements plus one. Accordingly, the base station 102, the controller/processor 375, and/or the TX processor 316 executing the TX RE skipping component 140 and/or the transmission component 148 may provide means for transmitting the time domain signal during the symbol.

Some Further Example Clauses

Implementation examples are described in the following numbered clauses:

1. A method of wireless communication, comprising:
    determining that a beam change is to occur during a symbol;
    receiving a time domain signal during at least a portion of the symbol, wherein the time domain signal includes a number of repetitions of a waveform;
    performing a fast Fourier transform (FFT) on the time domain signal; and
    determining transmitted bits or a channel from a subset of resource elements output from the FFT for a frequency domain allocation, wherein each resource element of the subset of resource elements is spaced apart by a number of empty resource elements equal to the number of repetitions of the waveform minus one.
2. The method of clause 1, wherein performing the FFT comprises performing FFT based frequency domain equalization.
3. The method of clause 1 or 2, further comprising receiving an indication of the number of empty resource elements and a starting resource element.
4. The method of clause 3, wherein the indication is an RRC message, a media access control (MAC) control element (CE), or a downlink control information (DCI) that triggers the beam change.
5. The method of any of clauses 1-4, wherein the frequency domain allocation is a number of resource blocks allocated for the symbol where the beam change is to occur.
6. The method of any of clauses 1-5, wherein the symbol is a first symbol of a physical downlink shared channel (PDSCH).
7. The method of any of clauses 1-6, wherein the symbol includes a demodulation reference signal (DMRS) or a channel state information—reference signal (CSI-RS), wherein the subset of resource elements output from the FFT includes all bits for the DMRS or the CSI-RS.
8. The method of clause 7, wherein the subset of resource elements aligns with resource elements assigned to the DMRS or the CSI-RS.
9. The method of clause 1, wherein the beam change is for a physical downlink control channel (PDCCH) for a user equipment (UE), and wherein a downlink control information (DCI) for the UE is not scheduled on the symbol where the beam change is to occur.
10. The method of clause 9, wherein the DCI for the UE is transmitted on one or more other symbols of a control resource set (CORESET) that includes the symbol where the beam change is to occur.
11. The method of any of clauses 1-10, wherein receiving the time domain signal during at least the portion of the symbol comprises replicating the waveform as measured by a time tracking loop for the number of repetitions as input to the FFT.
12. A method of wireless communication, comprising:
    determining that a beam change is to occur during a symbol;
    allocating bits to a subset of resource elements for the symbol in a frequency domain allocation, wherein each resource element of the subset of resource elements is spaced apart by a number of empty resource elements;
    performing an inverse fast Fourier transform (IFFT) on the resource elements to generate a time domain signal; and
    transmitting the time domain signal during the symbol, wherein the time domain signal includes a number of repetitions of a transmitted waveform equal to the number of empty resource elements between each resource element of the subset of resource elements plus one.
13. The method of clause 12, further comprising transmitting an indication of the number of empty resource elements and a starting resource element.
14. The method of clause 13, wherein the indication is an RRC message, a media access control (MAC) control element (CE), or a downlink control information (DCI) that triggers the beam change.
15. The method of any of clauses 12-14, wherein the frequency domain allocation is a number of resource blocks allocated for the symbol where the beam change is to occur.
16. The method of any of clauses 12-15, wherein the symbol where the beam change is to occur is a first symbol of a physical downlink shared channel (PDSCH).
17. The method of any of clauses 12-16, wherein the symbol where the beam change is to occur includes a demodulation reference signal (DMRS) or a channel state information—reference signal (CSI-RS), wherein the bits allocated to the subset of resource elements include all bits for the DMRS or the CSI-RS.
18. The method of clause 17, wherein allocating the bits to the subset of resource elements comprises shifting a starting resource element of the subset of resource elements to align with a resource element assigned to the DMRS or the CSI-RS.
19. The method of clause 12, wherein the beam change is for a physical downlink control channel (PDCCH) for a user equipment (UE), and wherein a downlink control information (DCI) for the UE is not scheduled on the symbol where the beam change is to occur.
20. The method of clause 19, wherein the DCI for the UE is transmitted on one or more other symbols of a control resource set (CORESET) excluding the symbol where the beam change is to occur.
21. The method of any of clauses 12-20, further comprising adding a cyclic prefix to the time domain signal, wherein a time for the beam change is longer than the cyclic prefix.
22. An apparatus for wireless communication by a user equipment (UE), comprising:
a memory storing computer-executable instructions; and
at least one processor coupled to the memory and configured to execute the computer-executable instructions to:
determine that a beam change is to occur during a symbol;
receive a time domain signal during at least a portion of the symbol,
wherein the time domain signal includes a number of repetitions of a waveform;
perform a fast Fourier transform (FFT) on the time domain signal; and
determine transmitted bits or a channel from a subset of resource elements output from the FFT for a frequency domain allocation, wherein each resource element of the subset of resource elements is spaced apart by a number of empty resource elements equal to the number of repetitions of the waveform minus one.
23. The apparatus of clause 22, wherein the at least one processor is configured to perform FFT based frequency domain equalization.
24. The apparatus of clause 22 or 23, wherein the at least one processor is configured to receive an indication of the number of empty resource elements and a starting resource element.
25. The apparatus of clause 24, wherein the indication is an RRC message, a media access control (MAC) control element (CE), or a downlink control information (DCI) that triggers the beam change.
26. The apparatus of any of clauses 22-25, wherein the frequency domain allocation is a number of resource blocks allocated for the symbol where the beam change is to occur.
27. The apparatus of any of clauses 22-26, wherein the symbol is a first symbol of a physical downlink shared channel (PDSCH).
28. The apparatus of any of clauses 22-27, wherein the symbol includes a demodulation reference signal (DMRS) or a channel state information—reference signal (CSI-RS), wherein the subset of resource elements output from the FFT includes all bits for the DMRS or the CSI-RS.
29. The apparatus of clause 28, wherein the subset of resource elements aligns with resource elements assigned to the DMRS or the CSI-RS.
30. The apparatus of clause 22, wherein the beam change is for a physical downlink control channel (PDCCH) for a user equipment (UE), and wherein a downlink control information (DCI) for the UE is not scheduled on the symbol where the beam change is to occur.
31. The apparatus of clause 30, wherein the DCI for the UE is transmitted on one or more other symbols of a control resource set (CORESET) that includes the symbol where the beam change is to occur.
32. The apparatus of any of clauses 22-31, wherein to receive the time domain signal during at least the portion of the symbol the at least one processor is configured to replicate the waveform as measured by a time tracking loop for the number of repetitions as input to the FFT.
33. An apparatus for wireless communication by a transmitting device, comprising:
a memory storing computer-executable instructions; and
at least one processor coupled to the memory and configured to execute the computer-executable instructions to:
determine that a symbol is a first symbol after a beam change;
allocate bits to a subset of resource elements for the symbol in a frequency domain allocation, wherein each resource element of the subset of resource elements is spaced apart by a number of empty resource elements;
perform an inverse fast Fourier transform (IFFT) on the resource elements to generate a time domain signal; and
transmit the time domain signal during the symbol, wherein the time domain signal includes a number of repetitions of a transmitted waveform equal to the number of empty resource elements between each resource element of the subset of resource elements plus one.
34. The apparatus of clause 33, wherein the at least one processor is configured to transmit an indication of the number of empty resource elements and a starting resource element.
35. The apparatus of clause 34, wherein the indication is an RRC message, a media access control (MAC) control element (CE), or a downlink control information (DCI) that triggers the beam change.
36. The apparatus of any of clauses 33-35, wherein the frequency domain allocation is a number of resource blocks allocated for the symbol where the beam change is to occur.
37. The apparatus of any of clauses 33-36, wherein the symbol where the beam change is to occur is a first symbol of a physical downlink shared channel (PDSCH).
38. The apparatus of any of clauses 33-37, wherein the symbol where the beam change is to occur includes a demodulation reference signal (DMRS) or a channel state information—reference signal (CSI-RS), wherein the bits allocated to the subset of resource elements include all bits for the DMRS or the CSI-RS.
39. The apparatus of clause 38, wherein to allocate the bits to the subset of resource elements the at least one processor is configured to shift a starting resource element of the subset of resource elements to align with a resource element assigned to the DMRS or the CSI-RS.
40. The apparatus of clause 33, wherein the beam change is for a physical downlink control channel (PDCCH) for a user equipment (UE), and wherein a downlink control information (DCI) for the UE is not scheduled on the symbol where the beam change is to occur.
41. The apparatus of clause 40, wherein the DCI for the UE is transmitted on one or more other symbols of a control resource set (CORESET) excluding the symbol where the beam change is to occur.

42. The apparatus of any of clauses 33-41, wherein the at least one processor is configured to add a cyclic prefix to the time domain signal, wherein a time for the beam change is longer than the cyclic prefix.

43. An apparatus for wireless communication, comprising:
   means for determining that a beam change is to occur during a symbol;
   means for receiving a time domain signal during at least a portion of the symbol, wherein the time domain signal includes a number of repetitions of a waveform;
   means for performing a fast Fourier transform (FFT) on the time domain signal; and
   means for determining transmitted bits or a channel from a subset of resource elements output from the FFT for a frequency domain allocation, wherein each resource element of the subset of resource elements is spaced apart by a number of empty resource elements equal to the number of repetitions of the waveform minus one.

44. The apparatus of clause 43, wherein the means for performing the FFT is configured to perform FFT based frequency domain equalization.

45. The apparatus of clause 43 or 44, further comprising means for receiving an indication of the number of empty resource elements and a starting resource element.

46. The apparatus of clause 45, wherein the indication is an RRC message, a media access control (MAC) control element (CE), or a downlink control information (DCI) that triggers the beam change.

47. The apparatus of any of clauses 43-46, wherein the frequency domain allocation is a number of resource blocks allocated for the symbol where the beam change is to occur.

48. The apparatus of any of clauses 43-47, wherein the symbol is a first symbol of a physical downlink shared channel (PDSCH).

49. The apparatus of any of clauses 43-48, wherein the symbol includes a demodulation reference signal (DMRS) or a channel state information—reference signal (CSI-RS), wherein the subset of resource elements output from the FFT includes all bits for the DMRS or the CSI-RS.

50. The apparatus of clause 49, wherein the subset of resource elements aligns with resource elements assigned to the DMRS or the CSI-RS.

51. The apparatus of clause 43, wherein the beam change is for a physical downlink control channel (PDCCH) for a user equipment (UE), and wherein a downlink control information (DCI) for the UE is not scheduled on the symbol where the beam change is to occur.

52. The apparatus of clause 51, wherein the DCI for the UE is transmitted on one or more other symbols of a control resource set (CORESET) that includes the symbol where the beam change is to occur.

53. The apparatus of any of clauses 43-52, wherein the means for receiving the time domain signal during at least the portion of the symbol is configured to replicate the waveform as measured by a time tracking loop for the number of repetitions as input to the FFT.

54. An apparatus for wireless communication, comprising:
   means for determining that a beam change is to occur during a symbol;
   means for allocating bits to a subset of resource elements for the symbol in a frequency domain allocation, wherein each resource element of the subset of resource elements is spaced apart by a number of empty resource elements;
   means for performing an inverse fast Fourier transform (IFFT) on the resource elements to generate a time domain signal; and
   means for transmitting the time domain signal during the symbol, wherein the time domain signal includes a number of repetitions of a transmitted waveform equal to the number of empty resource elements between each resource element of the subset of resource elements plus one.

55. The apparatus of clause 54, further comprising means for transmitting an indication of the number of empty resource elements and a starting resource element.

56. The apparatus of clause 55, wherein the indication is an RRC message, a media access control (MAC) control element (CE), or a downlink control information (DCI) that triggers the beam change.

57. The apparatus of any of clauses 54-56, wherein the frequency domain allocation is a number of resource blocks allocated for the symbol where the beam change is to occur.

58. The apparatus of any of clauses 54-57, wherein the symbol where the beam change is to occur is a first symbol of a physical downlink shared channel (PDSCH).

59. The apparatus of any of clauses 54-58, wherein the symbol where the beam change is to occur includes a demodulation reference signal (DMRS) or a channel state information—reference signal (CSI-RS), wherein the bits allocated to the subset of resource elements include all bits for the DMRS or the CSI-RS.

60. The apparatus of clause 59, wherein the means for allocating the bits to the subset of resource elements is configured to shift a starting resource element of the subset of resource elements to align with a resource element assigned to the DMRS or the CSI-RS.

61. The apparatus of clause 54, wherein the beam change is for a physical downlink control channel (PDCCH) for a user equipment (UE), and wherein a downlink control information (DCI) for the UE is not scheduled on the symbol where the beam change is to occur.

62. The apparatus of clause 61, wherein the DCI for the UE is transmitted on one or more other symbols of a control resource set (CORESET) excluding the symbol where the beam change is to occur.

63. The apparatus of any of clauses 54-62, further comprising means for adding a cyclic prefix to the time domain signal, wherein a time for the beam change is longer than the cyclic prefix.

64. A non-transitory computer-readable medium storing computer-executable instructions that when executed by a processor of a receiving device cause the processor to:
   determine that a beam change is to occur during a symbol;
   receive a time domain signal during at least a portion of the symbol, wherein the time domain signal includes a number of repetitions of a waveform;
   perform a fast Fourier transform (FFT) on the time domain signal; and
   determine transmitted bits or a channel from a subset of resource elements output from the FFT for a frequency domain allocation, wherein each resource element of the subset of resource elements is spaced apart by a number of empty resource elements equal to the number of repetitions of the waveform minus one.

65. The non-transitory computer-readable medium of clause 64, wherein the code to perform the FFT comprises code to perform FFT based frequency domain equalization.

66. The non-transitory computer-readable medium of clause 64 or 65, further comprising code to receive an indication of the number of empty resource elements and a starting resource element.

67. The non-transitory computer-readable medium of clause 66, wherein the indication is an RRC message, a media access control (MAC) control element (CE), or a downlink control information (DCI) that triggers the beam change.

68. The non-transitory computer-readable medium of any of clauses 64-67, wherein the frequency domain allocation is a number of resource blocks allocated for the symbol where the beam change is to occur.

69. The non-transitory computer-readable medium of any of clauses 64-68, wherein the symbol is a first symbol of a physical downlink shared channel (PDSCH).

70. The non-transitory computer-readable medium of any of clauses 64-68, wherein the symbol includes a demodulation reference signal (DMRS) or a channel state information—reference signal (CSI-RS), wherein the subset of resource elements output from the FFT includes all bits for the DMRS or the CSI-RS.

71. The non-transitory computer-readable medium of clause 70, wherein the subset of resource elements aligns with resource elements assigned to the DMRS or the CSI-RS.

72. The non-transitory computer-readable medium of clause 64, wherein the beam change is for a physical downlink control channel (PDCCH) for a user equipment (UE), and wherein a downlink control information (DCI) for the UE is not scheduled on the symbol where the beam change is to occur.

73. The non-transitory computer-readable medium of clause 72, wherein the DCI for the UE is transmitted on one or more other symbols of a control resource set (CORESET) that includes the symbol where the beam change is to occur.

74. The non-transitory computer-readable medium of any of clauses 64-73, wherein the code to receive the time domain signal during at least the portion of the symbol comprises code to replicate the waveform as measured by a time tracking loop for the number of repetitions as input to the FFT.

75. A non-transitory computer-readable medium storing computer-executable instructions that when executed by a processor of a transmitting device cause the processor to:
determine that a beam change is to occur during a symbol;
allocate bits to a subset of resource elements for the symbol in a frequency domain allocation, wherein each resource element of the subset of resource elements is spaced apart by a number of empty resource elements;
perform an inverse fast Fourier transform (IFFT) on the resource elements to generate a time domain signal; and
transmit the time domain signal during the symbol, wherein the time domain signal includes a number of repetitions of a transmitted waveform equal to the number of empty resource elements between each resource element of the subset of resource elements plus one.

76. The non-transitory computer-readable medium of clause 75, further comprising code to transmit an indication of the number of empty resource elements and a starting resource element.

77. The non-transitory computer-readable medium of clause 76, wherein the indication is an RRC message, a media access control (MAC) control element (CE), or a downlink control information (DCI) that triggers the beam change.

78. The non-transitory computer-readable medium of any of clauses 75-77, wherein the frequency domain allocation is a number of resource blocks allocated for the symbol where the beam change is to occur.

79. The non-transitory computer-readable medium of any of clauses 75-78, wherein the symbol where the beam change is to occur is a first symbol of a physical downlink shared channel (PDSCH).

80. The non-transitory computer-readable medium of any of clauses 75-79, wherein the symbol where the beam change is to occur includes a demodulation reference signal (DMRS) or a channel state information—reference signal (CSI-RS), wherein the bits allocated to the subset of resource elements include all bits for the DMRS or the CSI-RS.

81. The method of clause 80, wherein the code to allocate the bits to the subset of resource elements comprises code to shift a starting resource element of the subset of resource elements to align with a resource element assigned to the DMRS or the CSI-RS.

82. The non-transitory computer-readable medium of clause 75, wherein the beam change is for a physical downlink control channel (PDCCH) for a user equipment (UE), and wherein a downlink control information (DCI) for the UE is not scheduled on the symbol where the beam change is to occur.

83. The non-transitory computer-readable medium of clause 82, wherein the DCI for the UE is transmitted on one or more other symbols of a control resource set (CORESET) excluding the symbol where the beam change is to occur.

84. The non-transitory computer-readable medium of any of clauses 75-83, further comprising code to add a cyclic prefix to the time domain signal, wherein a time for the beam change is longer than the cyclic prefix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
   determining that a beam change is to occur during a symbol;
   receiving a time domain signal during at least a portion of the symbol, wherein the time domain signal includes a number of repetitions of a waveform;
   performing a fast Fourier transform (FFT) on the time domain signal; and
   determining transmitted bits or a channel from a subset of resource elements output from the FFT for a frequency domain allocation, wherein each resource element of the subset of resource elements is spaced apart by a number of empty resource elements equal to the number of repetitions of the waveform minus one.

2. The method of claim 1, wherein performing the FFT comprises performing FFT based frequency domain equalization.

3. The method of claim 1, further comprising receiving an indication of the number of empty resource elements and a starting resource element.

4. The method of claim 3, wherein the indication is an RRC message, a media access control (MAC) control element (CE), or a downlink control information (DCI) that triggers the beam change.

5. The method of claim 1, wherein the frequency domain allocation is a number of resource blocks allocated for the symbol where the beam change is to occur.

6. The method of claim 1, wherein the symbol is a first symbol of a physical downlink shared channel (PDSCH).

7. The method of claim 1, wherein the symbol includes a demodulation reference signal (DMRS) or a channel state information—reference signal (CSI-RS), wherein the subset of resource elements output from the FFT includes all bits for the DMRS or the CSI-RS.

8. The method of claim 7, wherein the subset of resource elements aligns with resource elements assigned to the DMRS or the CSI-RS.

9. The method of claim 1, wherein the beam change is for a physical downlink control channel (PDCCH) for a user equipment (UE), and wherein a downlink control information (DCI) for the UE is not scheduled on the symbol where the beam change is to occur.

10. The method of claim 9, wherein the DCI for the UE is transmitted on one or more other symbols of a control resource set (CORESET) that includes the symbol where the beam change is to occur.

11. The method of claim 1, wherein receiving the time domain signal during at least the portion of the symbol comprises replicating the waveform as measured by a time tracking loop for the number of repetitions as input to the FFT.

12. A method of wireless communication, comprising:
    determining that a beam change is to occur during a symbol;
    allocating bits to a subset of resource elements for the symbol in a frequency domain allocation, wherein each resource element of the subset of resource elements is spaced apart by a number of empty resource elements;
    performing an inverse fast Fourier transform (IFFT) on the resource elements to generate a time domain signal; and
    transmitting the time domain signal during the symbol, wherein the time domain signal includes a number of repetitions of a transmitted waveform equal to the number of empty resource elements between each resource element of the subset of resource elements plus one.

13. The method of claim 12, further comprising transmitting an indication of the number of empty resource elements and a starting resource element.

14. The method of claim 13, wherein the indication is an RRC message, a media access control (MAC) control element (CE), or a downlink control information (DCI) that triggers the beam change.

15. The method of claim 12, wherein the frequency domain allocation is a number of resource blocks allocated for the symbol where the beam change is to occur.

16. The method of claim 12, wherein the symbol where the beam change is to occur is a first symbol of a physical downlink shared channel (PDSCH).

17. The method of claim 12, wherein the symbol where the beam change is to occur includes a demodulation reference signal (DMRS) or a channel state information—reference signal (CSI-RS), wherein the bits allocated to the subset of resource elements include all bits for the DMRS or the CSI-RS.

18. The method of claim 17, wherein allocating the bits to the subset of resource elements comprises shifting a starting resource element of the subset of resource elements to align with a resource element assigned to the DMRS or the CSI-RS.

19. The method of claim 12, wherein the beam change is for a physical downlink control channel (PDCCH) for a user equipment (UE), and wherein a downlink control information (DCI) for the UE is not scheduled on the symbol where the beam change is to occur.

20. The method of claim 19, wherein the DCI for the UE is transmitted on one or more other symbols of a control resource set (CORESET) excluding the symbol where the beam change is to occur.

21. The method of claim 12, further comprising adding a cyclic prefix to the time domain signal, wherein a time for the beam change is longer than the cyclic prefix.

22. An apparatus for wireless communication by a user equipment (UE), comprising:
- a memory storing computer-executable instructions; and
- at least one processor coupled to the memory and configured to execute the computer-executable instructions to:
  - determine that a beam change is to occur during a symbol;
  - receive a time domain signal during at least a portion of the symbol, wherein the time domain signal includes a number of repetitions of a waveform;
  - perform a fast Fourier transform (FFT) on the time domain signal; and
  - determine transmitted bits or a channel from a subset of resource elements output from the FFT for a frequency domain allocation, wherein each resource element of the subset of resource elements is spaced apart by a number of empty resource elements equal to the number of repetitions of the waveform minus one.

23. The apparatus of claim 22, wherein the at least one processor is configured to perform FFT based frequency domain equalization.

24. The apparatus of claim 22, wherein the at least one processor is configured to receive an indication of the number of empty resource elements and a starting resource element.

25. The apparatus of claim 22, wherein the symbol includes a demodulation reference signal (DMRS) or a channel state information—reference signal (CSI-RS), wherein the subset of resource elements output from the FFT includes all bits for the DMRS or the CSI-RS.

26. The apparatus of claim 22, wherein the at least one processor is configured to replicate the waveform as measured by a time tracking loop for a number of repetitions as input to the FFT.

27. An apparatus for wireless communication by a transmitting device, comprising:
- a memory storing computer-executable instructions; and
- at least one processor coupled to the memory and configured to execute the computer-executable instructions to:
  - determine that a symbol is a first symbol after a beam change;
  - allocate bits to a subset of resource elements for the symbol in a frequency domain allocation, wherein each resource element of the subset of resource elements is spaced apart by a number of empty resource elements;
  - perform an inverse fast Fourier transform (IFFT) on the resource elements to generate a time domain signal; and
  - transmit the time domain signal during the symbol, wherein the time domain signal includes a number of repetitions of a transmitted waveform equal to the number of empty resource elements between each resource element of the subset of resource elements plus one.

28. The apparatus of claim 27, wherein the at least one processor is configured to transmit an indication of the number of empty resource elements and a starting resource element.

29. The apparatus of claim 27, wherein the first symbol after the beam change includes a demodulation reference signal (DMRS) or a channel state information—reference signal (CSI-RS), wherein the bits allocated to the subset of resource elements include all bits for the DMRS or the CSI-RS, and wherein the at least one processor is configured to shift a starting resource element of the subset of resource elements to align with a resource element assigned to the DMRS or the CSI-RS.

30. The apparatus of claim 27, wherein the at least one processor is configured to add a cyclic prefix to the time domain signal, wherein a time for the beam change is longer than the cyclic prefix.

* * * * *